US011889269B2

(12) United States Patent
Karunasiri et al.

(10) Patent No.: US 11,889,269 B2
(45) Date of Patent: Jan. 30, 2024

(54) SYSTEMS AND METHODS FOR REMOTE LOADING OF A SOUND PROCESSING PROGRAM ONTO A SOUND PROCESSOR INCLUDED WITHIN A COCHLEAR IMPLANT SYSTEM

(71) Applicant: Advanced Bionics AG, Staefa (CH)

(72) Inventors: R. Tissa Karunasiri, Valencia, CA (US); Szilard V. Gyalay, Moorpark, CA (US); Anthony J. Spahr, Newhall, CA (US)

(73) Assignee: Advanced Bionics AG, Staefa (CH)

( * ) Notice: Subject to any disclaimer, the term of this patent is extended or adjusted under 35 U.S.C. 154(b) by 232 days.

(21) Appl. No.: 17/122,382

(22) Filed: Dec. 15, 2020

(65) Prior Publication Data

US 2021/0099814 A1 Apr. 1, 2021

Related U.S. Application Data

(63) Continuation of application No. 15/903,023, filed on Feb. 22, 2018, now Pat. No. 10,904,680.

(Continued)

(51) Int. Cl.
*H04R 25/00* (2006.01)

(52) U.S. Cl.
CPC .......... *H04R 25/554* (2013.01); *H04R 25/50* (2013.01); *H04R 25/606* (2013.01); *H04R 25/70* (2013.01);

(Continued)

(58) Field of Classification Search
CPC .................................................... H04R 25/554

(Continued)

(56) References Cited

U.S. PATENT DOCUMENTS 6,198,971 B1 3/2001 Leysieffer
6,635,048 B1 10/2003 Ullestad et al.

(Continued)

FOREIGN PATENT DOCUMENTS

WO 2008092183 8/2008
WO 2015092747 6/2015

OTHER PUBLICATIONS

Final Office Action received in U.S. Appl. No. 15/903,023 dated Jun. 23, 2020.

(Continued)

*Primary Examiner* — Nicole F Lavert
(74) *Attorney, Agent, or Firm* — ALG Intellectual Property, LLC

(57) ABSTRACT

A cochlear implant system includes a cochlear implant configured to be implanted within a patient and a sound processor communicatively coupled to the cochlear implant. The sound processor detects a unique identifier of the cochlear implant and establishes, by way of a network, an active network link with a remote computing system located remotely from the cochlear implant system. The sound processor transmits the unique identifier of the cochlear implant to the remote computing system over the active network link and, in response, receives data representative of a sound processing program associated with the cochlear implant from the remote computing system over the active network link. The sound processor stores the received data representative of the sound processing program on a local storage facility associated with the sound processor. Corresponding systems and methods are also disclosed.

20 Claims, 15 Drawing Sheets

Related U.S. Application Data

(60) Provisional application No. 62/462,835, filed on Feb. 23, 2017, provisional application No. 62/462,833, filed on Feb. 23, 2017, provisional application No. 62/462,834, filed on Feb. 23, 2017.

(52) U.S. Cl.
CPC ...... *H04R 2225/31* (2013.01); *H04R 2225/55* (2013.01)

(58) Field of Classification Search
USPC .............................................................. 600/57
See application file for complete search history.

(56) References Cited

U.S. PATENT DOCUMENTS

| | | | | |
|---|---|---|---|---|
| 7,130,694 | B1 | 10/2006 | Voelkel | |
| 8,583,244 | B1 | 11/2013 | Calle et al. | |
| 8,630,432 | B2 | 1/2014 | Rass | |
| 8,694,112 | B2 | 4/2014 | Chapa et al. | |
| 8,812,125 | B2 | 8/2014 | Kaula et al. | |
| 9,613,028 | B2 | 4/2017 | Foo et al. | |
| 2005/0004618 | A1 | 1/2005 | Scott | |
| 2008/0137889 | A1 | 6/2008 | Rass | |
| 2009/0222064 | A1 | 9/2009 | Faltys et al. | |
| 2011/0082520 | A1* | 4/2011 | McElveen, Jr. .... | A61N 1/37282 607/57 |
| 2011/0116669 | A1* | 5/2011 | Karunasiri ........... | H04R 25/554 381/330 |
| 2012/0191161 | A1 | 7/2012 | Van Dijk | |
| 2013/0265144 | A1* | 10/2013 | Banna ................ | A61N 1/37217 340/12.5 |
| 2014/0243913 | A1* | 8/2014 | Lineaweaver ......... | H04R 25/70 607/57 |
| 2015/0343217 | A1* | 12/2015 | Smith ................ | A61N 1/36039 607/57 |
| 2016/0243360 | A1* | 8/2016 | Spahr ................. | A61N 1/36038 |
| 2016/0310736 | A1 | 10/2016 | Calle et al. | |
| 2017/0078809 | A1 | 3/2017 | Solum et al. | |
| 2017/0099644 | A1 | 4/2017 | Kindred et al. | |

OTHER PUBLICATIONS

Non-Final Office Action received in U.S. Appl. No. 15/903,023 dated Jan. 22, 2020.

* cited by examiner

SYSTEMS AND METHODS FOR REMOTE LOADING OF A SOUND PROCESSING PROGRAM ONTO A SOUND PROCESSOR INCLUDED WITHIN A COCHLEAR IMPLANT SYSTEM

RELATED APPLICATIONS

The present application is a continuation application of U.S. patent application Ser. No. 15/903,023, which was filed on Feb. 22, 2018, and which issued as U.S. Pat. No. 10,904,680 on Jan. 26, 2021. U.S. patent application Ser. No. 15/903,023 which application claims priority under 35 U.S.C. § 119(e) to U.S. Provisional Patent Application No. 62/462,833, filed on Feb. 23, 2017, to U.S. Provisional Patent Application No. 62/462,834, filed on Feb. 23, 2017, and to U.S. Provisional Patent Application No. 62/462,835, filed on Feb. 23, 2017. The contents of each of these applications are hereby incorporated by reference in their respective entireties. The disclosure of U.S. Provisional Patent Application No. 62/462,835 provides explicit support for each of the claims recited below. As such, the following background information, brief description of the drawings, and detailed description respectively recite the background information, brief description of the drawings, and detailed description of U.S. Provisional Patent Application No. 62/462,835. Additionally, the drawings submitted herewith are the same as the drawings of U.S. Provisional Patent Application No. 62/462,835.

BACKGROUND INFORMATION

The natural sense of hearing in human beings involves the use of hair cells in the cochlea that convert or transduce acoustic signals into auditory nerve impulses. Some types of hearing loss (e.g., sensorineural hearing loss) may occur when hair cells in the cochlea are absent or damaged, such that auditory nerve impulses cannot be generated from acoustic signals in the natural way. To overcome these types of hearing loss, cochlear implant systems have been developed.

Cochlear implant systems generally include a sound processor external to a patient that receives and processes acoustic signals (e.g., sounds presented to the patient by people and/or other sources of sound surrounding the patient) according to a particular sound processing program loaded on the sound processor and selected for use by the patient. More specifically, the sound processor may be communicatively coupled with a cochlear implant implanted within the patient and may be configured to direct the cochlear implant to bypass the hair cells in the cochlea by presenting electrical stimulation directly to the auditory nerve fibers (e.g., by way of electrodes on a lead extending through the cochlea). Direct stimulation of the auditory nerve fibers by the cochlear implant as directed by the sound processor may lead to the perception of sound in the brain and may result in at least partial restoration of hearing function for the patient.

Sound processing programs loaded onto sound processors are conventionally programmed and loaded onto the sound processors by professionals in clinical or manufacturing settings. For example, a manufacturer may preload one or more sound processing programs onto a new sound processor before shipping the sound processor to a particular patient, or a patient may meet with a clinician for an appointment and may provide subjective feedback to the clinician (e.g., as part of a fitting session during the appointment) to enable the clinician to program and load one or more sound processing programs onto the patient's sound processor for use by the patient after the appointment.

In certain examples, however, it may be inconvenient or impractical for a clinician or manufacturer to timely load new or updated sound processing programs onto sound processors in the conventional way. For instance, a sound processor may be lost or misplaced by the patient, may suffer accidental damage (e.g., water damage, shock damage from being dropped, etc.), or may otherwise malfunction such that the sound processor may have to be replaced with a replacement sound processor as soon as possible. In other examples, a patient may wish to order an upgraded (e.g., next generation) sound processor directly from the manufacturer or a distributor (i.e., rather than through his or her clinician), or may to want to try a new sound processing program or an updated version of an existing sound processing program that is not yet loaded on the patient's sound processor. Similarly, a clinician may want the patient to try a new or updated sound processing program (e.g., based on a virtual appointment taking place over a telephone call, based on a previously set goal or milestone that the patient reaches, etc.). In these and various other situations, it may be inconvenient, costly, time consuming, and/or frustrating for various parties (e.g., patients, clinicians, manufacturing personnel, etc.) to load desired sound processing programs onto sound processors in the conventional way.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
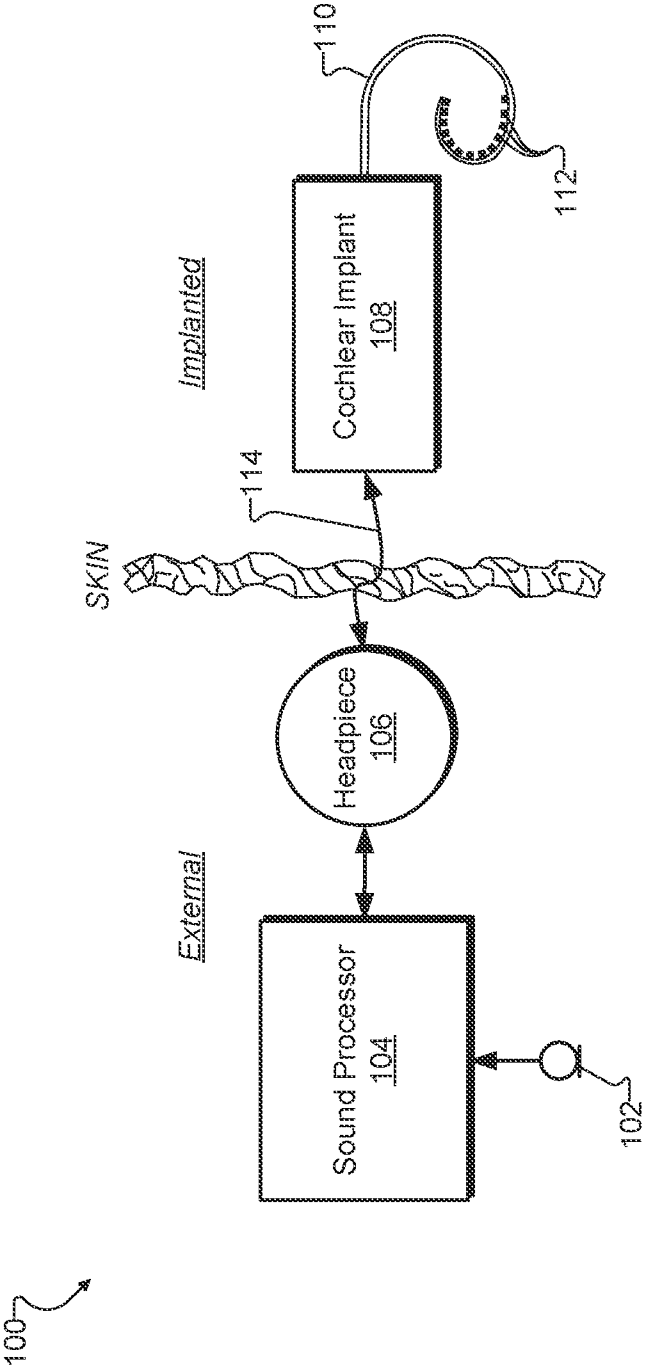
FIG. 1 illustrates an exemplary cochlear implant system according to principles described herein.

Systems and methods for remote loading of a sound processing program onto a sound processor included within a cochlear implant system are described herein.

For example, from the perspective of a sound processor included within a cochlear implant system, the sound processor may include at least one physical computing component (e.g., one or more processors, memory resources, communication interfaces, etc.) that perform and/or facilitate the remote loading of the sound processing program as follows. The sound processor (i.e., the at least one physical computing component within the sound processor) may detect a unique identifier (e.g., a serial number or the like) of a cochlear implant included within the cochlear implant system (e.g., a cochlear implant implanted within a patient and communicatively coupled with the sound processor). Additionally, before or after detecting the unique identifier, the sound processor may establish (e.g., by way of a network) an active network link with a remote computing system located remotely from the cochlear implant system. For example, the sound processor may establish the active network link by initiating the active network link itself (i.e., by requesting the remote computing system to communicate with the sound processor to establish the active network link), or by responding to a request to establish the active network link initiated by the remote computing system.

With the active network link established, the sound processor may transmit (e.g., by way of the network and over the active network link) the unique identifier of the cochlear implant to the remote computing system. In response to the transmission of the unique identifier, the sound processor may receive, from the remote computing system by way of the network and over the active network link, data representative of a sound processing program associated with the cochlear implant. Accordingly, the sound processor may store the received data representative of the sound processing program on a local storage facility associated with the sound processor (e.g., within storage space internal to the sound processor, within storage space of a local device coupled with the sound processor on the sound processor's side of the active network link, etc.).

As another example from the perspective of a remote computing system (e.g., a cloud server or the like), the remote computing system may similarly include at least one physical computing component (e.g., one or more processors, memory resources, network interfaces, etc.) that perform and/or facilitate the remote loading of the sound processing program as follows. The remote computing system (i.e., the at least one physical computing component within the remote computing system) may establish (e.g., by way of the network described above) an active network link with a sound processor included within a cochlear implant system that is located remotely from the remote computing system. For example, as with the sound processor, the remote computing system may establish the active network link by initiating the active network link or by responding to a request to establish the active network link initiated by the sound processor.

The remote computing system may be associated with (e.g., may include) a remote storage facility that stores a repository of sound processing programs that are associated with different cochlear implants included within different cochlear implant systems. As such, and once the active network link is established, the remote computing system may receive (e.g., by way of the network and over the active network link) a unique identifier of a cochlear implant included within the cochlear implant system from the sound processor. For example, as described above, the cochlear implant may be implanted within the patient and may be communicatively coupled with the sound processor. Based on the unique identifier of the cochlear implant, the remote computing system may identify a sound processing program (e.g., included in the repository of sound processing programs) that is associated with the cochlear implant. In response to the identification of the sound processing program associated with the cochlear implant, the remote computing system may transmit data representative of the identified sound processing program to the sound processor by way of the network and over the active network link.

As used herein, "sound processing programs" may refer to any data stored within and/or used by a sound processor (e.g., a sound processor included within a cochlear implant system). In particular, sound processing programs may refer to datasets (e.g., files, etc.) including personalized and/or customized data associated with a particular cochlear implant within the cochlear implant system. In some examples, a sound processing program may represent a particular program (e.g., parameters, methodologies, techniques, etc.) by which an incoming audio signal is to be processed and prepared prior to being used by the particular cochlear implant to stimulate the patient. For example, a sound processing program may include a discrete dataset that is customized to direct the particular cochlear implant in accordance with unique needs and/or preferences of a patient using the cochlear implant in different types of listening environments. Specifically, for instance, different electrical parameters, channel mappings, dynamic ranges, electrode settings, microphone directionality settings, and/or other parameters and settings may be set in different sound processing programs to optimize the operation of the cochlear implant for relatively noisy or relatively quiet listening environments, for relatively large or relatively small rooms (e.g., having more or less echo and/or reverberation), for listening to music, for listening to speech, for listening to an auxiliary audio input, and/or for any other listening scenario or listening environment as may serve a particular implementation.

As used herein, the "remote loading" of a sound processing program may refer to any of various aspects of the transfer, receipt, storage, selection, and/or use of a sound processing program on a sound processor that does not initially have local access to the sound processing program, but, as a result of the remote loading, is able to access a copy of the sound processing program from a remote computing system (e.g., by way of a network). A remote computing system located remotely from a cochlear implant system may be any computing system (e.g., cloud server, etc.) that is communicatively coupled to the cochlear implant system (i.e., the sound processor of the cochlear implant system) only or primarily by way of a network (e.g., including the Internet and/or one or more subnetworks). In some examples, for instance, the remote computing system may be located a long distance away from the cochlear implant system (e.g., in a different country, a different state, a different city, etc.). In other examples, the remote computing system may merely be located in a different building than the cochlear implant system (or a different room of the same building) such that the active network link may be used for the remote computing system and cochlear implant system to communicate.

As such, the remote loading of the sound processing program from the remote computing system to the sound processor of the cochlear implant system may include transferring the sound processing program from a remote storage facility on the remote computing system's side of the active network link to a local storage facility on the cochlear implant system's side of the active network link, as will be described in more detail below. In some examples, the remote loading of the sound processing program may additionally refer to the storage of the sound processing program, the selecting and switching (e.g., loading up) of the sound processing program onto the sound processor as the active sound processing program, and/or the use of the sound processing program by the sound processor to process incoming audio signals for the patient.

As a result of the remote loading of a sound processing program onto a sound processor described herein, sound processors, cochlear implant systems, and people associated with them (e.g., patients, clinicians, etc.) may benefit in various ways. For example, the systems and methods for remote loading of sound processing programs described herein may enable a patient to replace lost or inoperative sound processors with much less hassle and/or downtime (e.g., time when the user cannot hear, can only hear with one ear, etc.) than has been possible previously. For instance, as will be illustrated and described in more detail below, as soon as an order is received from a patient, a manufacturer can immediately send the patient a "blank" replacement sound processor (i.e., a new sound processor without any sound processing programs specifically associated with any particular cochlear implant or patient) using, for example, same-day shipping. Moreover, any of a variety of distribution centers around the country and the world may be used to fill the replacement sound processor order since the replacement sound processor is blank (i.e., the same generic sound processor available from all the other distribution centers). This may further decrease the patient's downtime, particularly if the patient is traveling away from home, for example, when the issues with the sound processor are experienced.

Moreover, this simplified paradigm for replacing a sound processor may also benefit a manufacturer of the sound processor (who may benefit, for example, from a less complex and/or costly return merchandise authorization ("RMA") process), as well as clinicians and other personnel responsible for programming one or more sound processors for the patient (who may, for example, no longer need to be involved in replacing the sound processor at all). These systems and methods also allow new generations of sound processors to be backwards-compatible with previous sound processor generations. For example, as long as a new generation of sound processor is configured to properly couple with the cochlear implant of a particular patient, the new sound processor may conveniently load any sound processing programs that a patient or clinician may desire, even if the sound processor is different than (e.g., an upgrade from) a previous sound processor used by the patient.

Additionally, the systems and methods for remote loading of sound processing programs described herein may facilitate more convenient interactions between patients and their caretakers (e.g., clinicians). For example, it may be possible for patients and clinicians to have "virtual" appointments (e.g., between regularly-scheduled in-person appointments) in which the clinician and patient communicate over a phone call or the like without the patient having to physically travel to the clinician's office to meet in person. Based on the patient's current status and needs, the clinician could provide the patient new sound processing programs or updates to existing sound processing programs that the patient could try in preparation for the next appointment or in response to issues the patient has been experiencing. In certain examples, the patient could also request (e.g., by way of a clinician-approved automated website) access to new sound processing programs that may improve the patient's hearing under particular circumstances or in specialized situations. In all of these examples, it may save time, effort, frustration, and/or costs for the patient to be able to receive access to new sound processing programs from home or on the road, rather than having to travel to meet the clinician in person or rely on the manufacturer to program a new sound processor for the patient.

Various embodiments will now be described in more detail with reference to the figures. The disclosed systems and methods may provide one or more of the benefits mentioned above and/or various additional and/or alternative benefits that will be made apparent herein.

FIG. 1 shows an exemplary cochlear implant system 100. As will be described in more detail below, one or more elements of cochlear implant system 100 may facilitate or perform remote loading of a sound processing program onto a sound processor. As shown, cochlear implant system 100 may include various components configured to be located external to a cochlear implant patient including, but not limited to, a microphone 102, a sound processor 104, and a headpiece 106. Cochlear implant system 100 may further include various components configured to be implanted within the patient including, but not limited to, a cochlear implant 108 (also referred to as an implantable cochlear stimulator) and a lead 110 (also referred to as an intracochlear electrode array) with a plurality of electrodes 112 disposed thereon. In certain examples, additional or alternative components may be included within cochlear implant system 100 as may serve a particular implementation. Additionally, it will be understood that in certain implementations (e.g., "fully-implantable" implementations), one or more of the components described and illustrated as being external to the patient may alternatively be implanted within the patient. The components shown in FIG. 1 will now be described in more detail.

Microphone 102 may be configured to detect audio signals presented to the patient. Microphone 102 may be implemented in any suitable manner. For example, microphone 102 may include a microphone such as a T-MIC™ microphone from Advanced Bionics. Microphone 102 may be associated with a particular ear of the patient such as by being located in a vicinity of the particular ear (e.g., within the concha of the ear near the entrance to the ear canal). In some examples, microphone 102 may be held within the concha of the ear near the entrance of the ear canal by a boom or stalk that is attached to an ear hook configured to be selectively attached to sound processor 104. Additionally or alternatively, microphone 102 may be implemented by one or more microphones disposed within headpiece 106, one or more microphones disposed within sound processor

104, one or more beam-forming microphones, and/or any other suitable microphone or microphones as may serve a particular implementation.

Sound processor 104 (i.e., at least one physical computing component included within sound processor 104) may be configured to direct cochlear implant 108 to generate and apply electrical stimulation (also referred to herein as "stimulation current") representative of one or more audio signals (e.g., one or more audio signals detected by microphone 102, input by way of an auxiliary audio input port, etc.) to one or more stimulation sites associated with an auditory pathway (e.g., the auditory nerve) of the patient. Exemplary stimulation sites include, but are not limited to, one or more locations within the cochlea, the cochlear nucleus, the inferior colliculus, and/or any other nuclei in the auditory pathway. While, for the sake of simplicity, electrical stimulation will be described herein as being applied to one or both of the cochleae of a patient, it will be understood that stimulation current may also be applied to other suitable nuclei in the auditory pathway. To this end, sound processor 104 may process the one or more audio signals in accordance with a selected sound processing strategy or program (i.e., a selected sound processing program) to generate appropriate stimulation parameters for controlling cochlear implant 108. Sound processor 104 may include or be implemented by a behind-the-ear ("BTE") unit, a body worn device, and/or any other sound processing unit as may serve a particular implementation. For example, sound processor 104 may be implemented by an electro-acoustic stimulation ("EAS") sound processor included in an EAS system configured to provide electrical and acoustic stimulation to a patient.

In certain implementations, sound processor 104 may wirelessly transmit stimulation parameters (e.g., in the form of data words included in a forward telemetry sequence) and/or power signals to cochlear implant 108 by way of a wireless communication link 114 between headpiece 106 and cochlear implant 108. It will be understood that communication link 114 may include a bidirectional communication link and/or one or more dedicated unidirectional communication links. In some examples, sound processor 104 may execute and operate in accordance with a sound processing program that has been loaded onto sound processor 104 (e.g., transferred to and stored within a local storage facility associated with sound processor 104, selected for use and loaded up into memory of sound processor 104, etc.), as will be described in more detail below.

As used herein, a sound processor such as sound processor 104 may be said to be "included within" a cochlear implant system when the sound processor is associated with the cochlear implant system in any suitable way. For example, sound processor 104 may be included within cochlear implant system 100 because sound processor 104 is a component of cochlear implant system 100 and is in communication with other components of cochlear implant system 100. However, if sound processor 104 were to be misplaced or destroyed, a replacement sound processor might also be said to be "included within" cochlear implant system 100 if the replacement sound processor is designated to be a component of cochlear implant system 100 (e.g., to eventually be used with cochlear implant system 100 after being shipped to the patient, for example), even if the replacement sound processor has not yet been shipped to or received by the patient or is not yet in communication with other components of cochlear implant system 100.

Headpiece 106 may be communicatively coupled to sound processor 104 and may include an external antenna (e.g., a coil and/or one or more wireless communication components) configured to facilitate selective wireless coupling of sound processor 104 to cochlear implant 108. Headpiece 106 may additionally or alternatively be used to selectively and wirelessly couple any other external device to cochlear implant 108. To this end, headpiece 106 may be configured to be affixed to the patient's head and positioned such that the external antenna housed within headpiece 106 is communicatively coupled to a corresponding implantable antenna (which may also be implemented by a coil and/or one or more wireless communication components) included within or otherwise associated with cochlear implant 108. In this manner, stimulation parameters and/or power signals may be wirelessly transmitted between sound processor 104 and cochlear implant 108 via communication link 114.

Cochlear implant 108 may include any type of implantable stimulator that may be used in association with the systems and methods described herein. For example, cochlear implant 108 may be implemented by an implantable cochlear stimulator. In some alternative implementations, cochlear implant 108 may include a brainstem implant and/or any other type of active implant or auditory prosthesis that may be implanted within a patient and configured to apply stimulation to one or more stimulation sites located along an auditory pathway of a patient.

In some examples, cochlear implant 108 may be configured to generate and apply electrical stimulation representative of an audio signal processed by sound processor 104 (e.g., an audio signal detected by microphone 102) in accordance with one or more stimulation parameters transmitted thereto by sound processor 104. Cochlear implant 108 may be further configured to apply the electrical stimulation to one or more stimulation sites within the patient via one or more electrodes 112 disposed along lead 110 (e.g., by way of one or more stimulation channels formed by electrodes 112). In some examples, cochlear implant 108 may include a plurality of independent current sources each associated with a channel defined by one or more of electrodes 112. In this manner, different stimulation current levels may be applied to multiple stimulation sites simultaneously (also referred to as "concurrently") by way of multiple electrodes 112.

Figure 2:
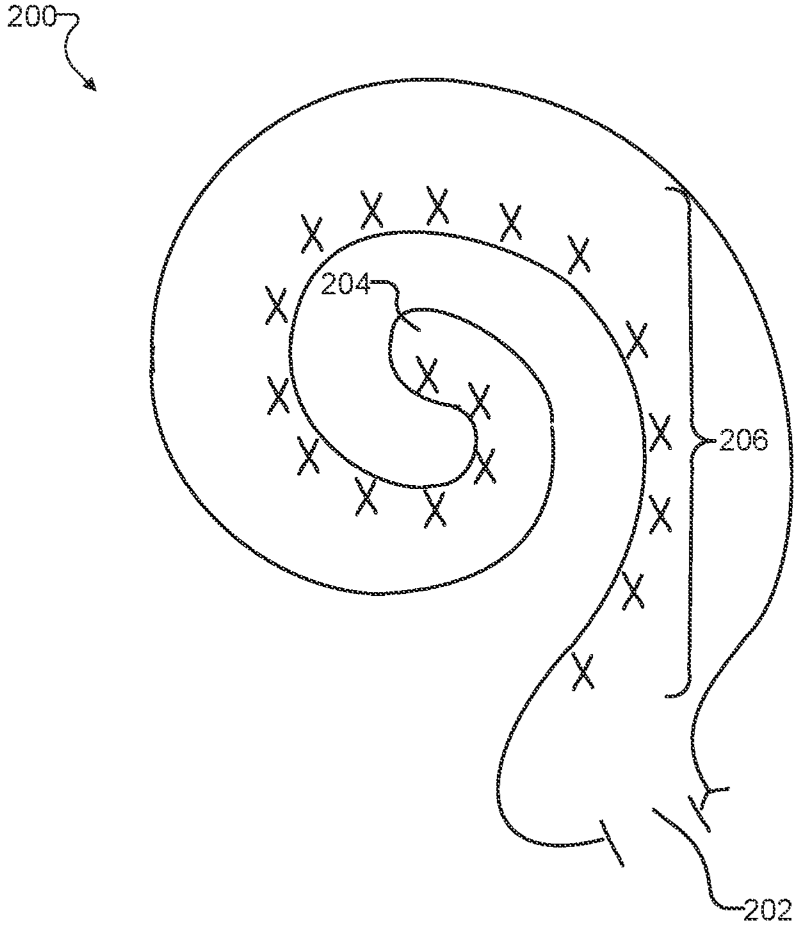
FIG. 2 illustrates a schematic structure of the human cochlea according to principles described herein.

FIG. 2 illustrates a schematic structure of a human cochlea 200 into which lead 110 may be inserted. As shown in FIG. 2, cochlea 200 is in the shape of a spiral beginning at a base 202 and ending at an apex 204. Within cochlea 200 resides auditory nerve tissue 206, which is denoted by Xs in FIG. 2. Auditory nerve tissue 206 is organized within cochlea 200 in a tonotopic manner. That is, relatively low frequencies are encoded at or near apex 204 of cochlea 200 (referred to as an "apical region") while relatively high frequencies are encoded at or near base 202 (referred to as a "basal region"). Hence, each location along the length of cochlea 200 corresponds to a different perceived frequency. Cochlear implant system 100 may therefore be configured to apply electrical stimulation to different locations within cochlea 200 (e.g., different locations along auditory nerve tissue 206) to provide a sensation of hearing to the patient. For example, when lead 110 is properly inserted into cochlea 200, each of electrodes 112 may be located at a different cochlear depth within cochlea 200 (e.g., at a different part of auditory nerve tissue 206) such that stimulation current applied to one electrode 112 may cause the patient to perceive a different frequency than the same stimulation current applied to a different electrode 112 (e.g., an electrode 112 located at a different part of auditory nerve tissue 206 within cochlea 200).

In some examples, a programming system separate from (i.e., not included within) cochlear implant system 100 may be selectively and communicatively coupled to sound processor 104 in order to perform one or more programming or fitting operations with respect to cochlear implant system 100. For example, during a conventional, in-person fitting session, a clinician or other user of the programming system may use the programming system to present audio clips to the patient by way of the cochlear implant system in order to facilitate evaluation of how well the cochlear implant system is performing for the patient.

Figure 3:
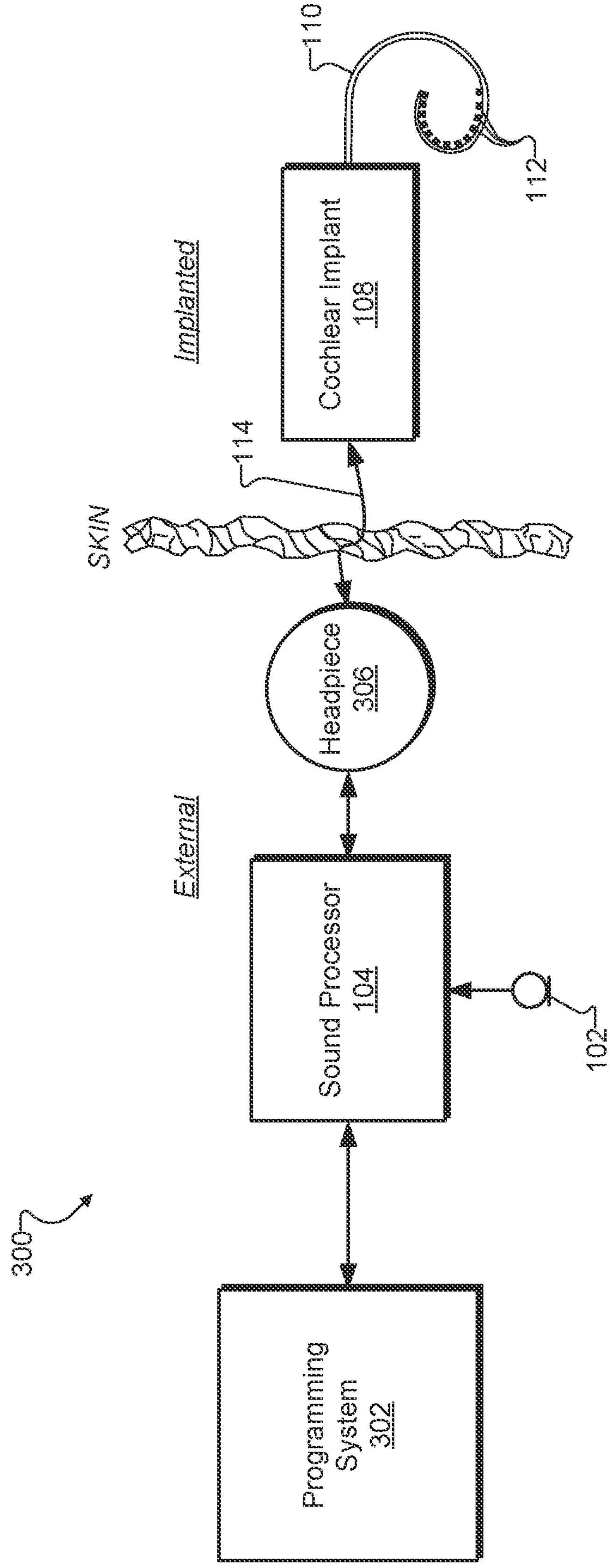
FIG. 3 shows an exemplary configuration in which a programming system is communicatively coupled to the cochlear implant system of FIG. 1 according to principles described herein.

To illustrate, FIG. 3 shows an exemplary configuration 300 in which a programming system 302 is communicatively coupled to sound processor 104. Programming system 302 may be implemented by any suitable combination of physical computing and communication devices including, but not limited to, a fitting station or device, a programming device, a personal computer, a laptop computer, a handheld device, a mobile device (e.g., a mobile phone), a clinician's programming interface ("CPI") device, and/or any other suitable component as may serve a particular implementation. In some examples, programming system 302 may provide one or more graphical user interfaces ("GUIs") (e.g., by presenting the one or more GUIs by way of a display screen) with which a clinician or other user may interact.

Figure 4:
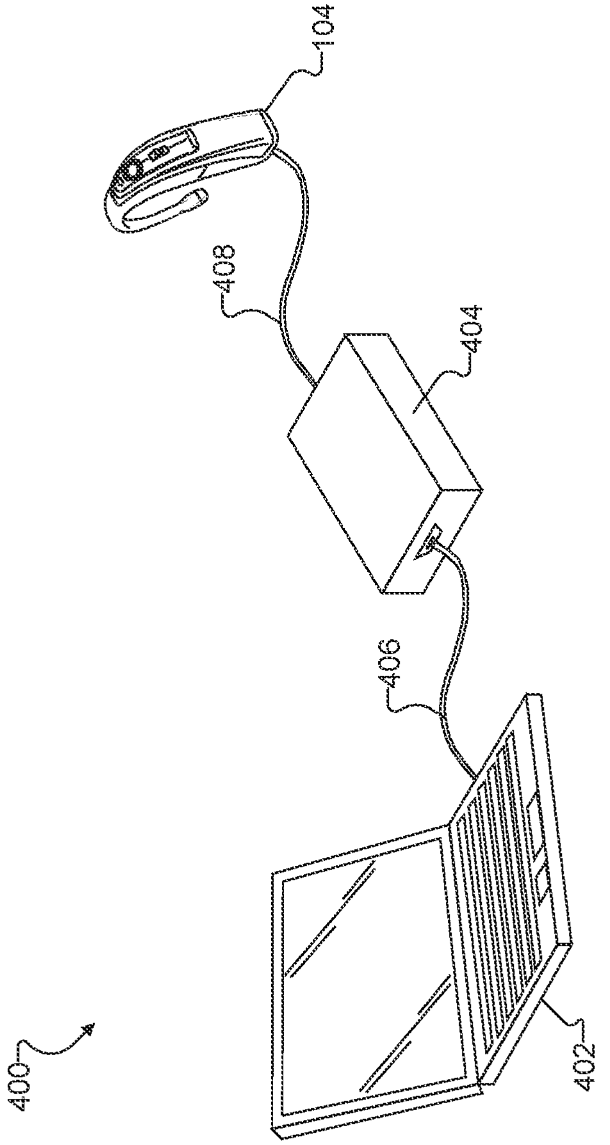
FIG. 4 illustrates an exemplary implementation of the programming system shown in FIG. 3 according to principles described herein.

FIG. 4 illustrates an exemplary configuration 400 in which programming system 302 is implemented by a computing device 402 and a CPI device 404. For example, configuration 400 may be used to program or fit a cochlear implant to a patient during a conventional (e.g., in-person) programming or fitting session. As shown, computing device 402 may be selectively and communicatively coupled to CPI device 404 by way of a cable 406. Likewise, CPI device 404 may be selectively and communicatively coupled to sound processor 104 by way of a cable 408. Cables 406 and 408 may each include any suitable type of cable that facilitates transmission of digital data between computing device 402 and sound processor 104. For example, cable 406 may include a universal serial bus ("USB") cable and cable 408 may include any type of cable configured to connect to a programming port included in sound processor 104. In some examples, computing device 402 may present an audio clip to the patient by digitally streaming the audio clip to sound processor 104 by way of cable 406, CPI device 404, and cable 408 without the audio clip ever being converted to an analog signal. In some alternative examples, wireless connections may be used to communicatively couple computing device 402 and CPI device 404, as well as CPI device 404 and sound processor 104.

As mentioned above, it may be desirable in at least some situations for a sound processor to be remotely loaded with a sound processing program such that, for example, sound processor 104 may be programmed or reprogrammed without necessarily being located in the same place (e.g., a cochlear implant clinic) as programming system 302 of configuration 300, or computing device 402 and CPI device 404 of configuration 400.

Figure 5:
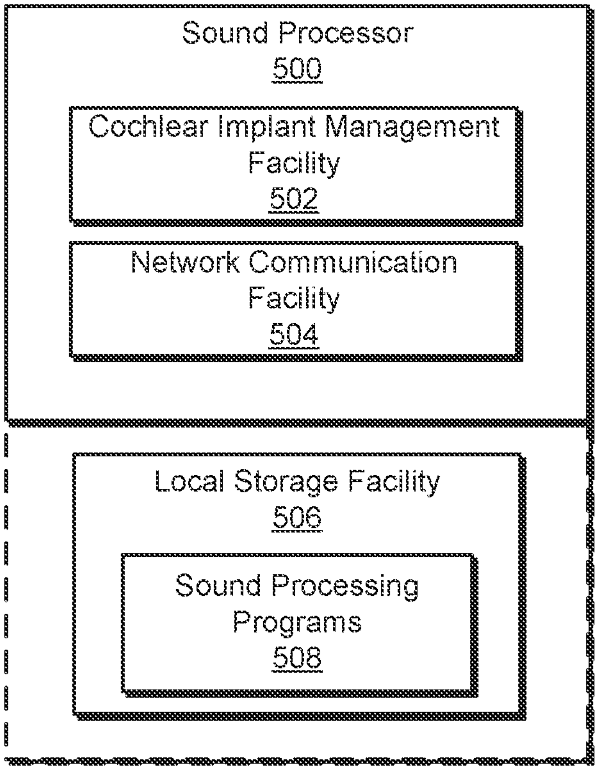
FIG. 5 illustrates exemplary components of a sound processor that interoperates with a remote computing system to remotely load a sound processing program onto the sound processor according to principles described herein.

To this end, FIG. 5 illustrates exemplary components of a sound processor 500 that may interoperate with a remote computing system (described below) to remotely load a sound processing program onto sound processor 500 without being physically located in a clinic or connected up to a programming system, CPI device, or the like. For example, sound processor 500 may be remotely loaded with a sound processing program over a network while sound processor 500 is located at the patient's home, or at a similar such location remote from the clinic that is convenient for the patient.

Sound processor 500 may be included within any cochlear implant system as may serve a particular implementation. For example, sound processor 500 may serve as the sound processor for a unilateral cochlear implant system such as cochlear implant system 100 illustrated in FIG. 1, or as one of the sound processors for a bilateral cochlear implant system. Additionally, as mentioned above, in certain examples sound processor 500 may be included within a fully-implantable cochlear implant system and, as such, may be implanted within a patient (e.g., integrated with a cochlear implant such as cochlear implant 108 under the patient's skin).

As shown, sound processor 500 may include, without limitation, a cochlear implant management facility 502, a network communication facility 504, and a local storage facility 506 selectively and communicatively coupled to one another. It will be recognized that although facilities 502 through 506 are shown to be separate facilities in FIG. 5, facilities 502 through 506 may be combined into fewer facilities, such as into a single facility, or divided into more facilities as may serve a particular implementation. Each of facilities 502 through 506 will now be described in more detail.

Cochlear implant management facility 502 may include one or more physical computing components (e.g., hardware and/or software components such as a processor, a memory, a communication interface, instructions stored on the memory for execution by the processor, etc.) that communicate with a cochlear implant communicatively coupled with system 500 (e.g., cochlear implant 108 of cochlear implant system 100). For example, cochlear implant management facility 502 may detect a unique identifier of the cochlear implant (e.g., by requesting and receiving the unique identifier from the cochlear implant while the cochlear implant is implanted within a patient and communicatively coupled with the sound processor), and/or may direct or facilitate directing the cochlear implant to apply electrical stimulation to a patient. In some examples, cochlear implant management facility 502 may direct the cochlear implant to apply electrical stimulation to the patient in accordance with a selected sound processing program. For instance, subsequent to the storage of a sound processing program on local storage facility 506, cochlear implant management facility 502 may activate the sound processing program on the sound processor by accessing the sound processing program from local storage facility 506 and directing the cochlear implant to stimulate the patient in accordance with the sound processing program.

Network communication facility 504 may similarly include one or more physical computing components (e.g., hardware and/or software components separate from those of cochlear implant management facility 502 or shared with cochlear implant management facility 502) that provide or facilitate communication by way of a network. More particularly, for example, network communication facility 504 may establish (e.g., by way of the network) an active network link with a remote computing system located remotely from sound processor 500. Network communication facility 504 may transmit to the remote computing system (e.g., by way of the network and over the active network link) the unique identifier of the cochlear implant detected by cochlear implant management facility 502. In response to the transmission of the unique identifier, network communication facility 504 may receive (e.g., from the remote computing system by way of the network and over the active network link) data representative of a sound processing program associated with the cochlear implant. Network communication facility 504 may also facilitate storing the received data representative of the sound processing program on local storage facility 506 (e.g., by communicating the data to local storage facility 506 and directing local storage facility 506 to store the data).

Local storage facility 506 may maintain any suitable data representative of one or more sound processing programs, along with any other data received, generated, managed, maintained, used, and/or transmitted by facilities 502 or 504 in a particular implementation. For example, as shown, local storage facility 506 may include sound processing programs 508, which may include one or more sound processing programs associated with one or more cochlear implants, including sound processing programs received from a remote computing system by network communication facility 504, as described above. Certain sound processing programs 508, for instance, may be associated with a cochlear implant in a first ear of a patient, while other sound processing programs 508 may be associated with a cochlear implant in a second ear (i.e., the other ear) of the patient.

As illustrated by the dashed line (i.e., in place of a solid line) connecting local storage facility 506 with the rest of sound processor 500 in FIG. 5, local storage facility 506 may be associated with sound processor 500 in any way as may serve a particular implementation. For instance, in certain examples, local storage facility 506 may be built directly into sound processor 500. In other words, for example, local storage facility 506 may include a built-in storage device (e.g., flash storage space or the like) included internally within sound processor 500. Additionally or alternatively, local storage facility 506 may include (e.g., be implemented by or included within) components or devices other than sound processor 500, but that may be located locally to sound processor 500 (e.g., in the same room or at least on the same side of a network as sound processor 500, rather than located at the other side of the network with the remote computing system described above) and/or communicatively coupled with sound processor 500.

For example, local storage facility 506 may include a component integrated within the cochlear implant system other than sound processor 500 (e.g., a headpiece such as headpiece 106, a cochlear implant such as cochlear implant 108, a battery assembly configured to power sound processor 500, etc.). As another example, local storage facility 506 may include an accessory of the cochlear implant system that performs only operations related to the cochlear implant system (e.g., a specially-customized remote control, a streaming device, a contralateral hearing device such as a contralateral sound processor or hearing aid, etc.). As yet another example, local storage facility 506 may include an independent device that performs operations unrelated to the cochlear implant system. For instance, local storage facility 506 may be implemented within a mobile device that also performs operations unrelated to the cochlear implant system such as a smartphone, a tablet device, a smart watch or other wearable computer, a portable hard drive, a memory stick, a laptop computer, or the like. Similarly, local storage facility 506 may be implemented by non-mobile devices (e.g., desktop computers, wireless routers, etc.) that also perform operations unrelated to the cochlear implant system.

Figure 6:
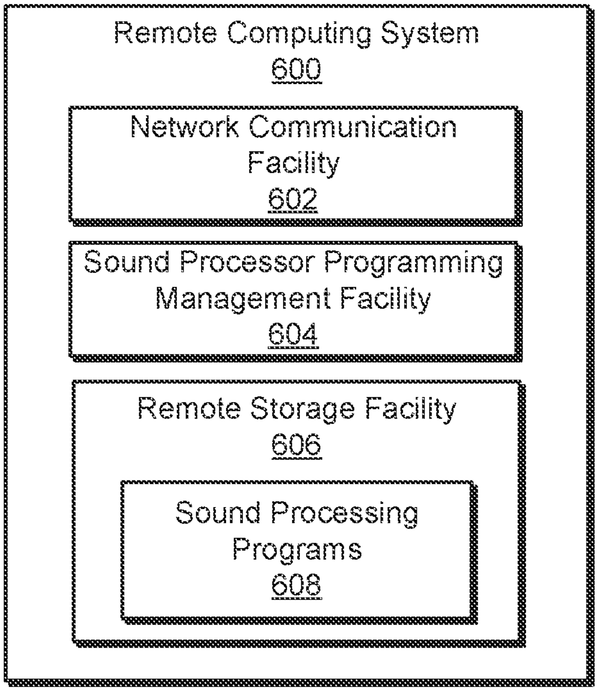
FIG. 6 illustrates exemplary components of a remote computing system that interoperates with a sound processor to remotely load a sound processing program onto the sound processor according to principles described herein.

FIG. 6 illustrates exemplary components of a remote computing system 600 that may interoperate with sound processor 500 to remotely load a sound processing program onto sound processor 500 as described above. For example, as described above, remote computing system 600 may provide sound processor 500 with the sound processing program over a network even while remote computing system 600 is located remotely from sound processor 500. For instance, remote computing system 600 may be located at a cochlear implant clinic or in a data hosting center while sound processor 500 is located at the patient's home.

Remote computing system 600 may be associated with (e.g., located at a facility of, owned by, operated by, etc.) any entity as may serve a particular implementation. For example, remote computing system 600 may be associated with a particular cochlear implant clinic and/or with a particular practitioner (e.g., clinician) at the cochlear implant clinic. As such, remote computing system 600 may be physically located within the clinic facility and may be owned and/or operated by the particular clinician or other employees associated with the clinic. In other examples, remote computing system 600 may be associated with a particular manufacturer of cochlear implant systems or components thereof (e.g., sound processor 500). As such, remote computing system 600 may be physically located within a manufacturing facility and may be owned and/or operated by the manufacturing entity that makes and sells the cochlear implant systems. In yet other examples, remote computing system 600 may owned, operated, and/or located within a facility of an entity other than the cochlear implant clinic or the manufacturer, such as a web hosting or data hosting entity that provides cloud-based data services.

As shown, remote computing system 600 may include, without limitation, a network communication facility 602, a sound processor programming management facility 604, and a remote storage facility 606 (e.g., that is remote to sound processor 500 but local to remote computing system 600) selectively and communicatively coupled to one another. It will be recognized that although facilities 602 through 606 are shown to be separate facilities in FIG. 6, facilities 602 through 606 may be combined into fewer facilities, such as into a single facility, or divided into more facilities as may serve a particular implementation. Each of facilities 602 through 606 will now be described in more detail.

Network communication facility 602 may include one or more physical computing components (e.g., hardware and/or software components such as a processor, a memory, a network interface, instructions stored on the memory for execution by the processor, etc.) that establish (e.g., by way of a network) an active network link with sound processor 500 included within a cochlear implant system (e.g., cochlear implant system 100) that is located remotely from remote computing system 600. Network communication facility 602 may also receive (e.g., from the sound processor by way of the network and over the active network link) a unique identifier of a cochlear implant (e.g., the cochlear implant that is included within the cochlear implant system and that is implanted within a patient and communicatively coupled with sound processor 500). As will be described below, network communication facility 602 may receive, from sound processor programming management facility 604, data representative of a particular sound processing program associated with the cochlear implant. As such, network communication facility 602 may transmit the data representative of the sound processing program to the sound processor by way of the network and over the active network link.

In some examples, network communication facility 602 may be a secure facility (e.g., accessed by way of proper security credentials, etc.), and may provide secure access to remote computing system 600 in accordance with any data security procedures and systems as may serve a particular implementation.

Sound processor programming management facility 604 may similarly include one or more physical computing components (e.g., hardware and/or software components separate from those of network communication facility 602 or shared with network communication facility 602) that provide or facilitate management of sound processor programming associated with (e.g., stored or otherwise managed by) remote computing system 600. For example, remote computing system 600 may include (e.g., stored within remote storage facility 606, as described below) a repository of sound processing programs associated with different cochlear implants included within different cochlear implant systems. As such, sound processor programming management facility 604 may identify, based on the unique identifier of the cochlear implant received by network communication facility 602, a sound processing program associated with the cochlear implant and that is included in the repository of sound processing programs.

Additionally, sound processor programming management facility 604 may provide data representative of the sound processing program to network communication facility 602 (e.g., in response to the identification of the sound processing program associated with the cochlear implant) so that network communication facility 602 may transmit the data representative of the sound processing program to sound processor 500 as described above. Sound processor programming management facility 604 may further manage the repository of sound processing programs in any way as may serve a particular implementation. For example, sound processor programming management facility 604 may receive and/or catalog new sound processing programs, provide an interface to enable browsing, selection, and/or downloading of particular sound processing programs, and so forth.

Remote storage facility 606 may maintain any suitable data representative of one or more sound processing programs, along with any other data received, generated, managed, maintained, used, and/or transmitted by facilities 602 or 604 in a particular implementation. For example, as shown, remote storage facility 606 may include sound processing programs 608, which may include the repository of sound processing programs associated with different cochlear implants included within different cochlear implant systems described above. As mentioned above, remote storage facility 606 is named using the adjective "remote" to help distinguish it from, for example, local storage facility 506 of sound processor 500. However, it will be understood that remote storage facility 606 may be local to remote computing system 600 and remote from sound processor 500, just as local storage facility 506 is remote to remote computing system 600 and local to sound processor 500. As such, remote storage facility 606 may be implemented by any suitable devices or components as may serve a particular implementation. For instance, if remote computing system includes a cloud server, remote storage facility 606 may be implemented by one or more hard drives included within the cloud server or a storage server associated with the cloud server.

As described above, sound processor 500 and remote computing system 600 may interoperate to remotely load a sound processing program onto sound processor 500 from remote computing system 600. To illustrate, FIG. 7 shows an exemplary configuration 700 in which sound processor 500 and remote computing system 600 interoperate to remotely load a sound processing program onto sound processor 500 while sound processor 500 is located remotely from remote computing system 600.

Specifically, as shown in configuration 700, a network 702 facilitates communication between remote computing system 600, which is coupled to network 702 by a connection 704, and sound processor 500, which is coupled to network 702 by a connection 706. A patient 708 may be associated with (e.g., may use and be located in a same location as) cochlear implant system 100, which, as shown, may include sound processor 500, local storage facility 506 (i.e., which may be associated with sound processor 500 in any of various ways as described above), and cochlear implant 108, along with other elements not explicitly illustrated in FIG. 7. As shown, while cochlear implant 108 is enlarged to show detail, cochlear implant 108 may be implanted within patient 708, while sound processor 500 and local storage facility 506 may be located externally to patient 708 (e.g., worn behind the ear of patient 708, etc.). Within cochlear implant 108, a unique identification ("ID") 710 may be stored or otherwise programmed or included such that sound processor 500 may detect it to identify cochlear implant 108. Unique ID 710 may include a serial number and/or any other unique dataset that identifies cochlear implant 108 as may serve a particular implementation.

Figure 7:
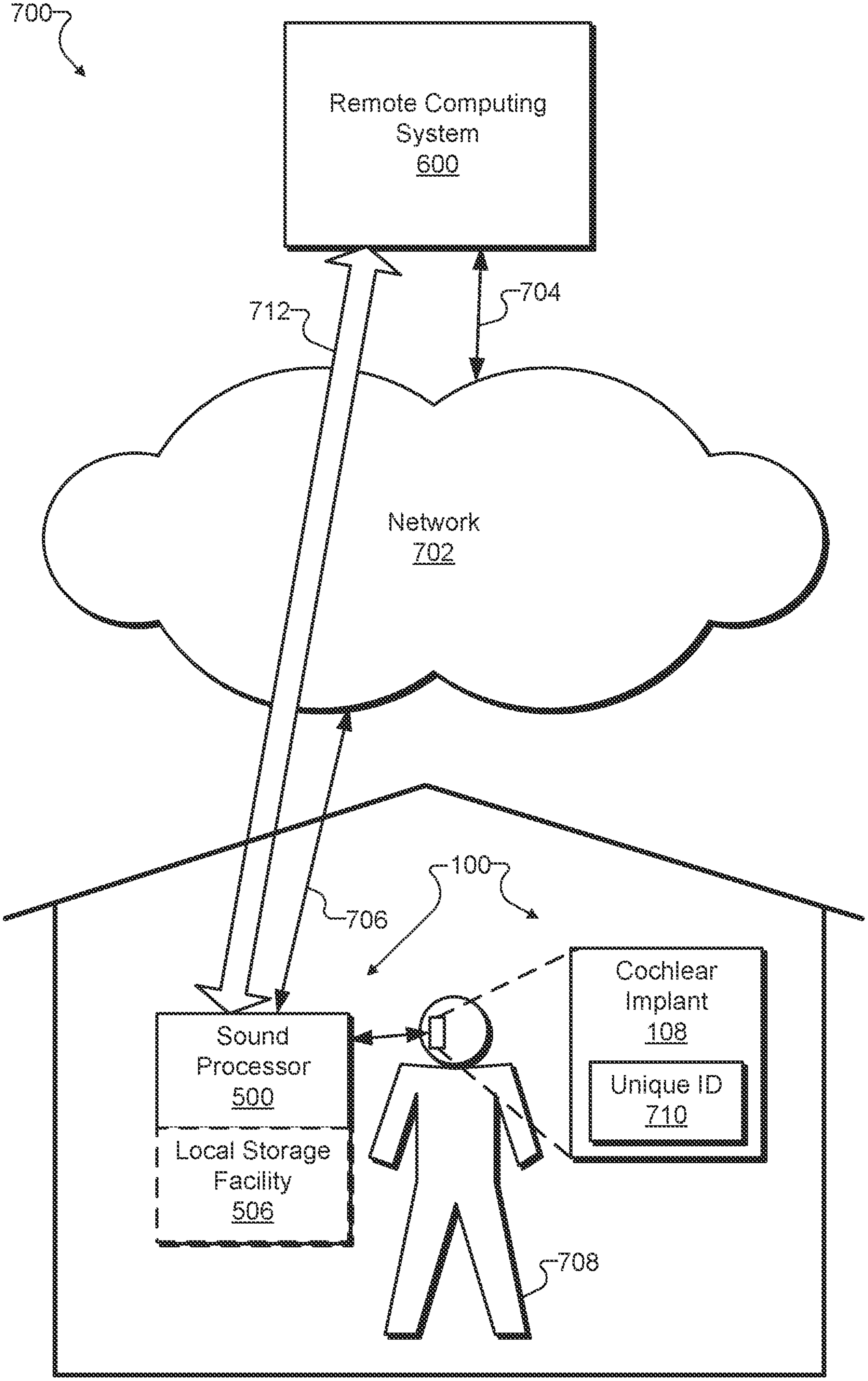
FIG. 7 illustrates an exemplary configuration in which the sound processor of FIG. 5 and the remote computing system of FIG. 6 interoperate to remotely load a sound processing program onto the sound processor according to principles described herein.

Patient 708 and the components of cochlear implant system 100 illustrated in FIG. 7 may be located remotely from remote computing system 600. For example, as shown, patient 708 and cochlear implant system 100 may be located at the home of patient 708, while remote computing system 600 may be implemented as a cloud server located elsewhere and accessed only by way of network 702.

To this end, network 702 may include any provider-specific network (e.g., a cable, satellite, or mobile phone carrier network, or the like), the Internet, any wide area network, or any other suitable network, and data may flow between sound processor 500 and remote computing system 600 by way of network 702 using any suitable communication technologies, devices, media, and protocols as may serve a particular implementation. While only one network 702 is shown to interconnect sound processor 500 and remote computing system 600 in configuration 700, it will be recognized that network 702 may represent various interconnected networks and/or subnetworks, and that devices and systems connected to network 702 may communicate with one another by way of multiple interconnected networks as may serve a particular implementation.

FIG. 7 illustrates how sound processor 500 and remote computing system 600 may interoperate to remotely load (e.g., from remote computing system 600) a sound processing program onto sound processor 500 within cochlear implant system 100. For example, as shown, sound processor 500 and remote computing system 600 may establish an active network link 712 by way of network 702. As used herein, both sound processor 500 and remote computing system 600 may be said to have "established" active network link 712 when communications between sound processor 500 and remote computing system 600 begin, regardless of whether sound processor 500 or remote computing system 600 initiated the first communication. Thus, for example, sound processor 500 and remote computing system 600 may each establish active network link 712 either by requesting the other system to initiate active network link 712, or by initiating active network link 712 in response to a request from the other system.

In order to establish active network link 712, both sound processor 500 and remote computing system 600 may be communicatively coupled, by way of connections 706 and 704, respectively, with network 702. Connections 706 and 704 may be implemented by any suitable connections as may serve a particular implementation. For example, connection 706, by way of which sound processor 500 may be communicatively coupled to network 702, may be implemented by, for instance, a wireless connection (e.g., a BLUETOOTH connection, an 802.11 (Wi-Fi) connection, a proprietary wireless connection, etc.), a wired connection (e.g., an Ethernet connection, etc.), by way of another device (e.g., a mobile device, a personal computer, a wireless router, etc.), or by any other type of connection as may serve a particular implementation. Similarly, connection 704, by way of which remote computing system 600 may be communicatively coupled to network 702, may be implemented by similar wireless or wired connections and protocols.

Prior or subsequent to the establishment of active network link 712, sound processor 500 may detect unique ID 710 of cochlear implant 108 implanted within patient 708. This detection may be performed in any suitable way. For example, in certain implementations, sound processor 500 may query (i.e., send a request and receive data in response to the request) cochlear implant 108 at a startup time or another suitable time (e.g., by way of headpiece 106, not explicitly shown in FIG. 7). In other examples, sound processor 500 may store unique ID 710 (e.g., within local storage facility 506) and detect unique ID 710 by accessing unique ID 710 where it is stored, rather than by querying cochlear implant 108.

Once unique ID 710 is detected, sound processor 500 may transmit unique ID 710 to remote computing system 600 over active network link 712. In some examples, sound processor 500 may further transmit to remote computing system 600 (i.e., together with unique ID 710) a sound processing program download request identifying a sound processing program that sound processor 500 is requesting to receive (i.e., a particular sound processing program associated with cochlear implant 108). The sound processing program download request may take any form as may serve a particular implementation. For example, the sound processing program download request may include a filename, filepath, or other identifying information for the particular sound processing program being requested. In some examples, the sound processing program download request may be a request for permission to access a particular folder or other similar structure within remote storage facility 606 of remote computing system 600 that is associated with (i.e., that contains) sound processing programs associated with cochlear implant 108, with patient 708, or the like.

As a result of the transmission by sound processor 500, remote computing system 600 may receive unique ID 710 and/or the sound processing program download request from sound processor 500 over active network link 712. In response to the receipt of unique ID 710, remote computing system 600 may validate unique ID 710 to ensure that unique ID 710 is valid and that the repository of sound processing programs (e.g., the repository included within remote storage facility 606) includes at least one sound processing program associated with the cochlear implant. In response to the validation of unique ID 710 and based on unique ID 710, remote computing system 600 may identify a sound processing program associated with cochlear implant 108 and that is included in the repository of sound processing programs. For example, if sound processor 500 transmitted a sound processing program download request identifying a requested sound processing program that is associated with cochlear implant 108, remote computing system 600 may identify the sound processing program based on the sound processing program download request (e.g., by identifying the requested sound processing program from the repository of sound processing programs).

In response to the identification of the sound processing program associated with cochlear implant 108, remote computing system 600 may transmit data representative of the identified sound processing program to sound processor 500 over active network link 712 and sound processor 500 may receive the data representative of the sound processing program. In examples where a sound processing program download request was transmitted, sound processor 500 may receive the data representative of the sound processing program in response to the transmission of the sound processing program download request. In response to receiving the data representative of the sound processing program, sound processor 500 may verify, scan, and/or otherwise check or analyze the data to ensure that the data is complete, secure, correct, and represents the expected sound processing program. Assuming such verification reveals that the correct sound processing program has been received without issue, sound processor 500 may store the received data representative of the sound processing program on local storage facility 506.

In some examples, sound processor 500 may store the data representative of the sound processing program on local storage facility 506 automatically (e.g., in the background without necessarily bringing the new storage to the attention of patient 708). In other examples, sound processor 500 may store the data representative of the sound processing program on local storage facility 506 only after notifying patient 708 and/or requesting and receiving approval from patient 708. This may be performed in any suitable way and may involve use of one or more user interfaces of sound processor 500 or of a device associated with sound processor 500 (e.g., a device such as a mobile device that includes local storage facility 506).

As described above, after the sound processing program has been stored in local storage facility 506, sound processor 500 may activate the sound processing program by accessing the sound processing program from local storage facility 506 (e.g., by loading up the sound processing program into a memory of sound processor 500), and directing cochlear implant 108 to stimulate patient 708 in accordance with the sound processing program.

Figure 8:
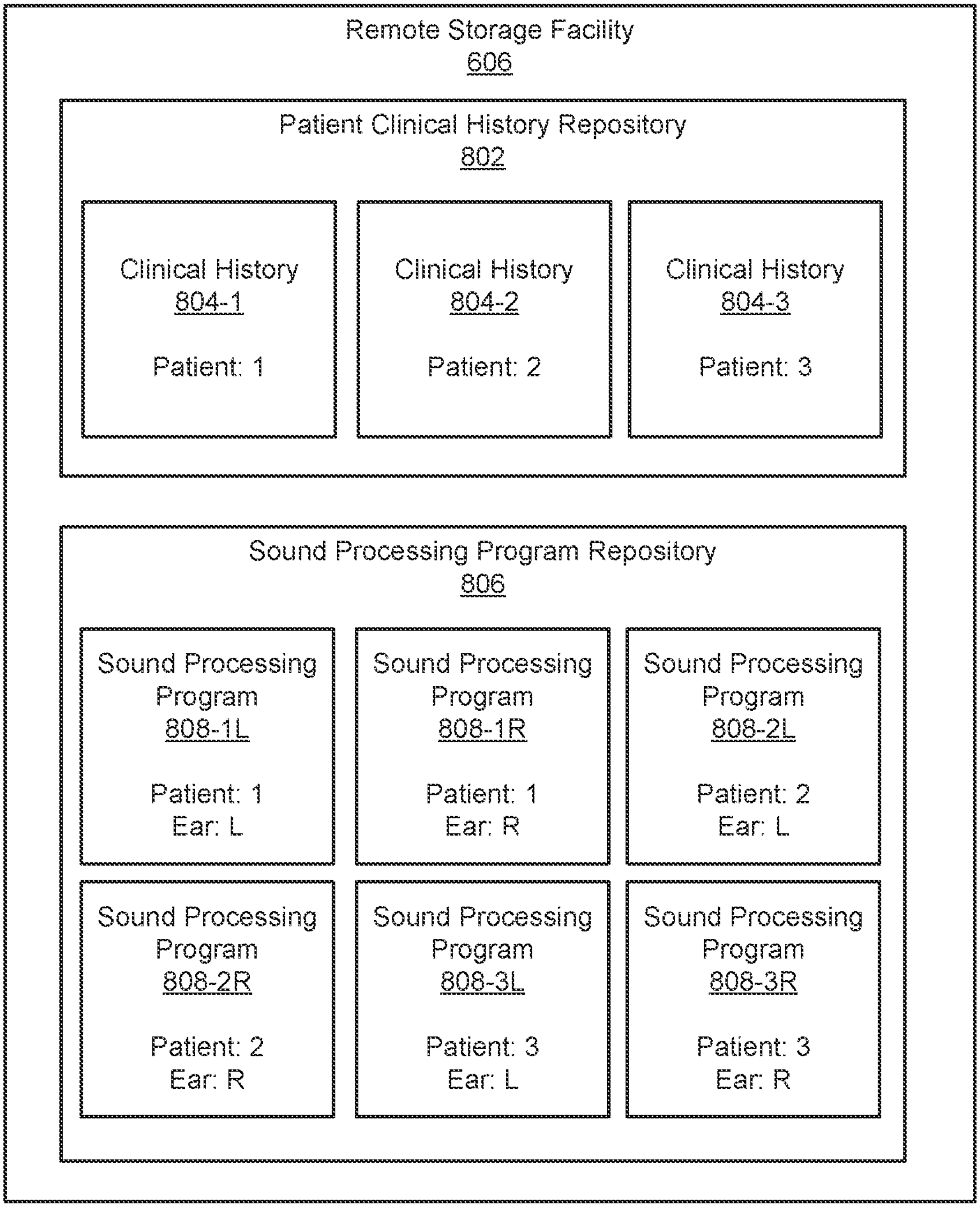
FIG. 8 illustrates exemplary components of a remote storage facility associated with the remote computing system of FIG. 6 according to principles described herein.
Figure 9:
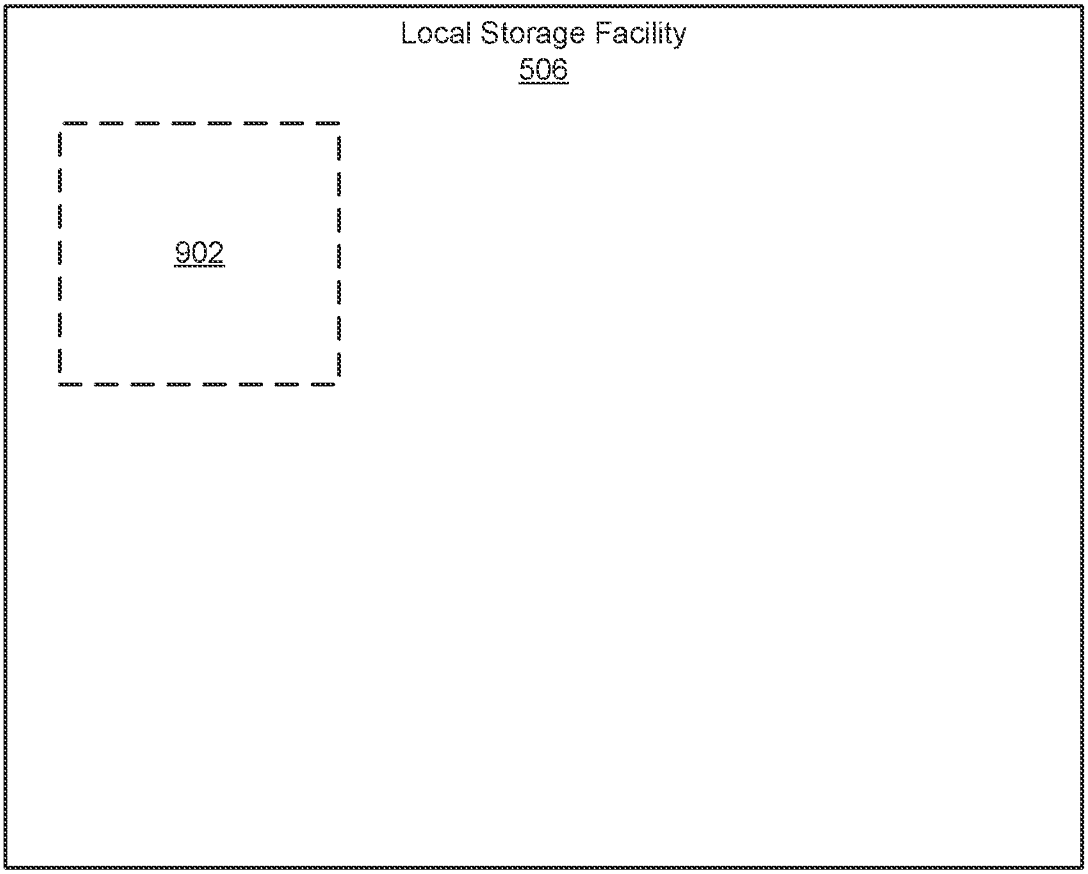
FIGS. 9-11 illustrate exemplary components of a local storage facility associated with the sound processor of FIG. 5 according to principles described herein.
Figure 10:
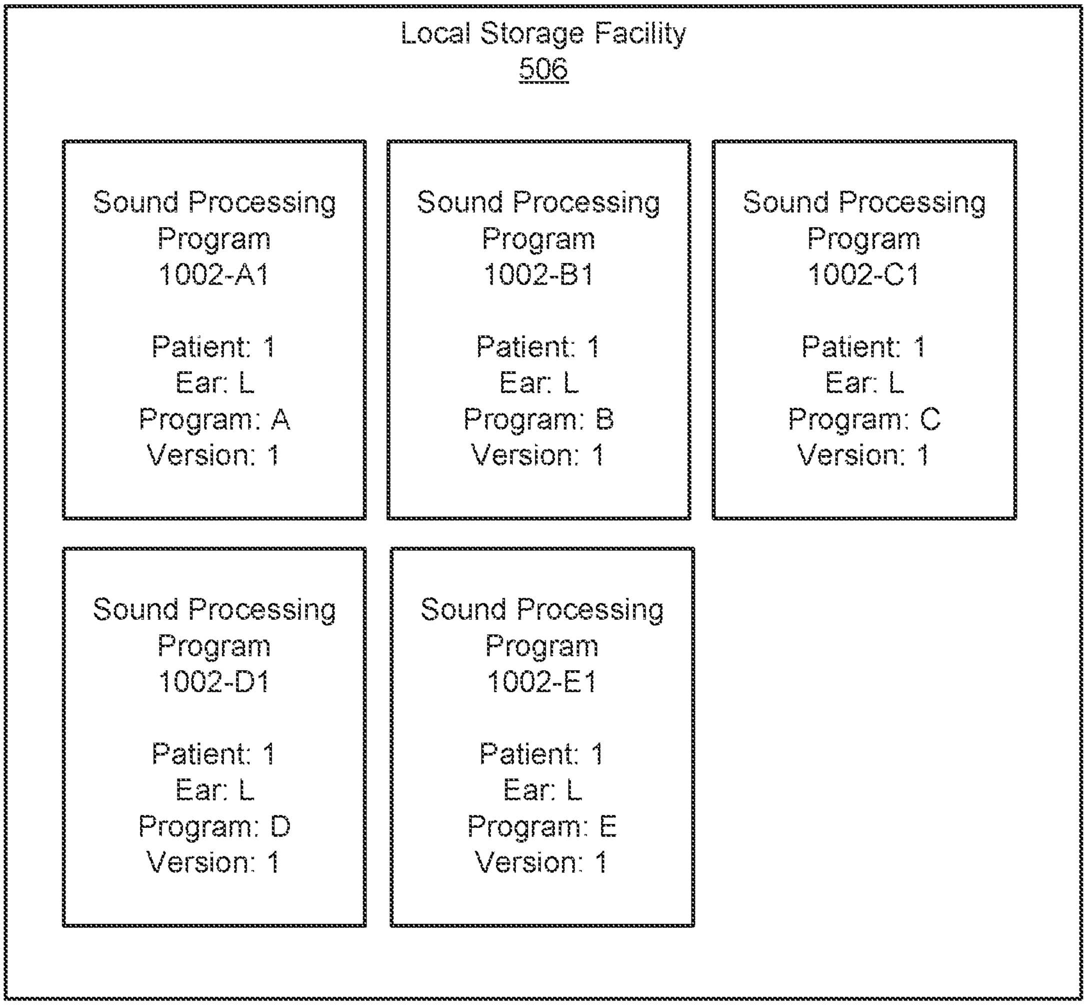
Figure 11:
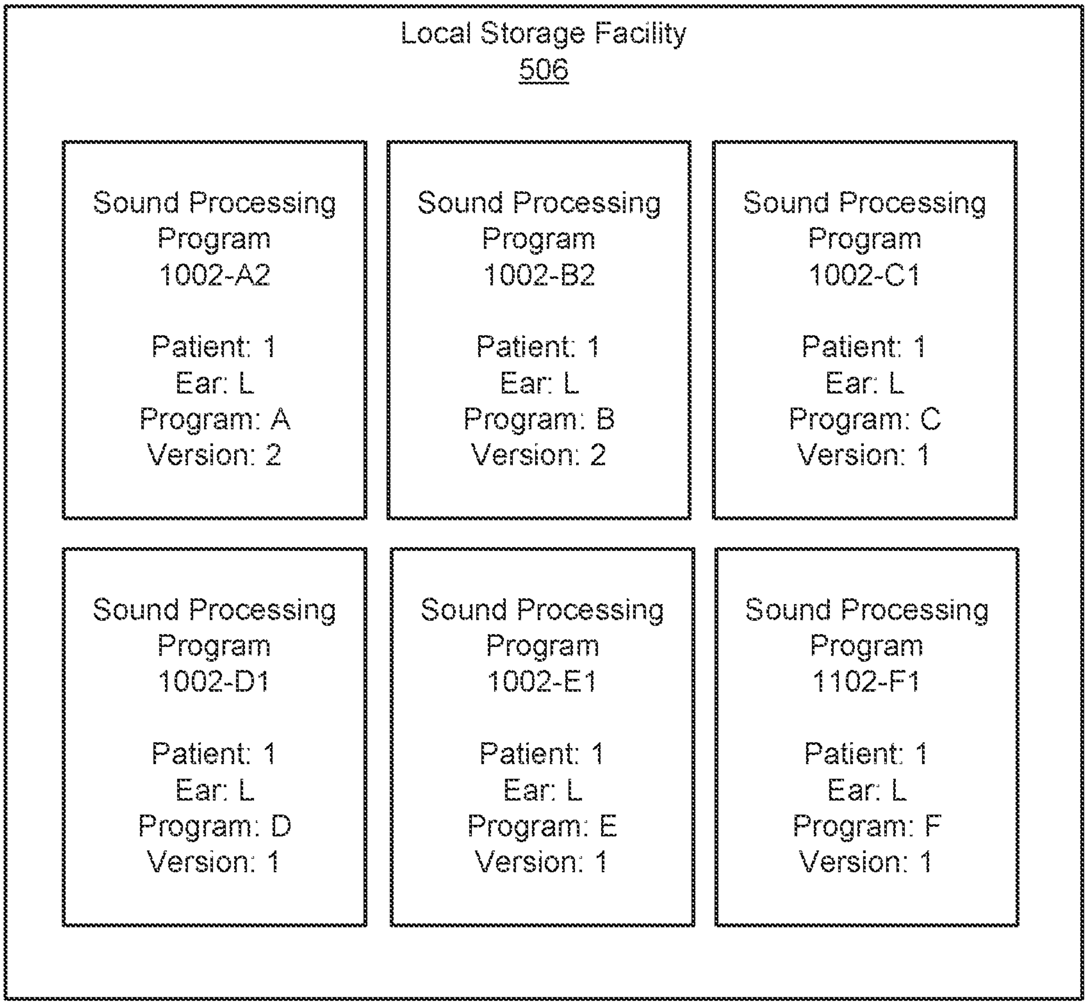

To further illustrate how sound processing programs may be remotely loaded from remote computing system 600 onto sound processor 500 in accordance with the systems and methods described herein, FIGS. 8-11 show additional detail within remote storage facility 606 of remote computing system 600 (FIG. 8) and within local storage facility 506 of sound processor 500 (FIGS. 9-11).

More specifically, FIG. 8 illustrates exemplary components of remote storage facility 606 associated with remote computing system 600, including a patient clinical history repository 802 having several clinical histories 804 (i.e., clinical histories 804-1 through 804-3) and a sound processing program repository 806 having several sound processing programs 808 (i.e., sound processing programs 808-1L, 808-1R, 808-2L, 808-2R, 808-3L, and 808-3R). While various data repositories and datasets (e.g., files or the like such as clinical histories 804 and sound processing programs 808) are illustrated in FIG. 8, it will be understood that the data shown in FIG. 8 to be included within remote storage facility 606 is exemplary only, and that more or fewer instances and/or types of data may be included in remote storage facility 606 in various examples as may serve a particular implementation. Additionally, it will be recognized that although data repositories 802 and 806 are shown to be separate data repositories in FIG. 8, these may be functionally combined or divided in any suitable way.

As shown, patient clinical history repository 802 may store one or more clinical histories 804 representative of clinical histories of one or more patients (e.g., patients associated with a particular clinician, with a particular clinic, with a particular cochlear implant system manufacturer, etc.). For example, as illustrated, clinical history 804-1 may be representative of a clinical history of a first patient ("Patient 1"), clinical history 804-2 may be representative of a clinical history of a second patient ("Patient 2"), and clinical history 804-3 may be representative of a clinical history of a third patient ("Patient 3").

Each clinical history 804 may include any information about the clinical history of a respective patient as may serve a particular implementation. For instance, clinical history 804-1 may include personal information about Patient 1 (e.g., name, contact information, physician information, etc.), information about a cochlear implant system and/or other medical devices used by Patient 1 (e.g., unique identifiers for a cochlear implant implanted within each ear of Patient 1, model numbers and serial numbers for various other cochlear implant system components currently used by Patient 1, etc.), clinical history information previously collected for Patient 1 (e.g., threshold and/or most comfortable levels obtained during fitting sessions, historical and current programming parameters used for the sound processor of Patient 1, historical and current sound processing programs loaded onto and/or used by the sound processor of Patient 1, etc.), and any other relevant information as may serve a particular implementation. Likewise, clinical histories 804-2 and 804-3 may include similar data with respect to Patient 2 and Patient 3, respectively.

By including clinical histories 804 for each patient for whom sound processing programs 808 are kept in sound processing program repository 806, remote storage facility 606 may provide sufficient information for sound processor 500 to discover, request, and load all the sound processing programs that it may be desirable for sound processor 500 to load. For example, if sound processor 500 is a blank sound processor (e.g., a replacement sound processor for a previous sound processor that was lost or broken), sound processor 500 and/or remote computing system 600 may determine which sound processing programs 808 from sound processing program repository 806 are appropriate to load onto sound processor 500 based on information from a particular clinical history 804. Specifically, by accessing data stored within clinical history 804-1, sound processor 500 and/or remote computing system 600 may determine what sound processing programs 808 were loaded onto a sound processor of Patient 1 (e.g., before the sound processor was lost or broken) and, as such, may cause the same sound processing programs 808 to be remotely loaded from remote storage facility 606 to local storage facility 506 according to the methods and systems described above.

Clinical histories 804 may be secure (e.g., stored as encrypted files or the like) such that clinical histories 804 may only be read or otherwise accessed based on a validation that sound processor 500 has permission to access the clinical history it is requesting access to. This may be done at least partly based on unique ID 710 that sound processor 500 transmits to remote computing system 600 and the validation of unique ID 710, as described above. For example, once remote computing system 600 has validated that unique ID 710 is valid and is associated with a particular patient for whom there is a clinical history 804 within patient clinical history repository 802, remote computing system 600 may provide sound processor 500 access to the relevant clinical history 804 to thereby facilitate sound processor 500 in determining which sound processing programs 808 should be requested and remotely loaded.

Sound processing program repository 806 may store any sound processing programs 808 as may serve a particular implementation. For example, as shown, sound processing program repository 806 may store various sound processing programs 808, as well as any other sound processing programs or other data as may serve a particular implementation.

Each sound processing program 808 may be associated with a particular cochlear implant. As such, each sound processing program 808 may be associated with a particular ear of a patient with which the particular cochlear implant is associated. Sound processing programs 808 are named and labeled in FIG. 8 to indicate which patient and ear each sound processing program 808 is associated with. For example, sound processing program 808-1L is associated with the left ("L") ear of the first patient ("Patient 1"), sound processing program 808-2R is associated with the right ("R") ear of the second patient ("Patient 2"), and so forth.

Additionally, it will be understood that it may be desirable in various situations for a sound processor to have access to a plurality of sound processing programs associated with a single cochlear implant (i.e., the cochlear implant associated with the particular ear of the particular patient that the sound processor is associated with). For example, sound processing programs associated with various programs (e.g., programs optimized for relatively noisy environments, for relatively quiet environments, for auxiliary audio input, for music listening, etc.) may be available within sound processing program repository 806 for each cochlear implant (i.e., each patient and ear combination). While such sound processing programs are not explicitly shown in FIG. 8, it will be understood that sound processing program repository 806 may include them in certain examples. Where illustrated herein (see FIGS. 10 and 11 below, for example) such sound processing programs may be distinguished using different letter such as, for instance, programs 'A', 'B', 'C', and the like.

FIGS. 9-11 illustrate exemplary components of local storage facility 506 associated with sound processor 500. For example, FIG. 9 illustrates local storage facility 506 when local storage facility 506 is blank (e.g., does not yet store any sound processing program). In some examples, as described above, sound processor 500 may be a new sound processor that has never been used to direct a cochlear implant to stimulate a patient. For instance, sound processor 500 may be a blank replacement sound processor that has been shipped to the patient to replace a sound processor that has been lost, broken, or otherwise rendered unusable. As used herein, a "new sound processor" may refer to a brand new sound processor that has never been used to direct a cochlear implant to stimulate any patient, or a used sound processor (e.g., a previously owned sound processor, a refurbished sound processor, etc.) that is "new" to a particular patient (e.g., a patient now associated with the sound processor) due to the sound processor never having been used to stimulate the particular patient.

In some implementations where local storage facility 506 is implemented by a separate device (e.g., a battery assembly of sound processor 500, a mobile device, etc.), local storage facility 506 may include data representative of one or more sound processing programs (e.g., backup copies of the sound processing programs) that may be used by a replacement sound processor 500. However, in certain examples (e.g., where local storage facility 506 includes a built-in storage device included internally within the replacement sound processor 500), local storage facility 506 may not yet store any sound processing programs prior to the establishment of active network link 712 and the remote loading of a sound processing program onto sound processor 500.

As illustrated by data 902 in FIG. 9, even though no sound processing programs may yet be stored within local storage facility 506, local storage facility 506 may not be completely devoid of data in certain implementations. For example, data 902 may include instructions that, when read and executed by sound processor 500, cause sound processor 500 to establish active network link 712 with remote computing system 600 by initiating active network link 712, to detect unique ID 710 of cochlear implant 108, and to otherwise proceed to perform operations described herein to remotely load one or more sound processing programs onto sound processor 500. In other examples, data 902 may represent other types of data unrelated to sound processing programs or to cochlear implant system 100 (e.g., in the case that local storage facility 506 is implemented by a device such as a mobile device that performs functions unrelated to the cochlear implant system), or any data other than a sound processing program as may serve a particular implementation. As used herein, local storage facility 506 and sound processor 500 associated with local storage facility 506 may be referred to as "blank" when, as in FIG. 9, local storage facility 506 does not include any sound processing program, regardless of what other data 902 may be stored in local storage facility 506.

After remotely loading one or more sound processing programs onto sound processor 500 according to the systems and methods described above, local storage facility 506 may store one or more sound processing programs associated with a particular cochlear implant (e.g., the cochlear implant for which sound processor 500 detected the unique ID).

To illustrate, FIG. 10 shows local storage facility 506 after the blank local storage facility 506 shown in FIG. 9 has received and stored several sound processing programs 1002 (i.e., sound processing programs 1002-A1, 1002-B1, 1002-C1, 1002-D1, and 1002-E1) that were remotely loaded onto sound processor 500. In this example, sound processor 500 may be associated with (e.g., worn on, communicatively coupled with a cochlear implant implanted at) a left ear of the patient previously referred to as Patient 1. Accordingly, as shown, each of sound processing programs 1002 are indicated to be associated with "Patient: 1" and "Ear: L".

Additionally, each sound processing program 1002 indicates a particular program and version of the program that is being represented. As described above with respect to sound processing programs 808 stored in remote storage facility 606 (see FIG. 8), various types of programs optimized for different environments and/or situations (e.g., relatively noisy or relatively quiet environments, auxiliary audio input, music listening, etc.) may be available for a particular cochlear implant (i.e., a particular ear of a particular patient). These programs are indicated by letters (i.e., "A" through "E") in FIG. 10, and, as shown, each sound processing program 1002 is named to indicate what program type it represents. For example, sound processing program 1002-A1 includes an "A" in the name because sound processing program 1002-A1 represents an "A"-type program for the cochlear implant associated with the left ear of Patient 1, and so forth.

Similarly, sound processing programs 1002 include version numbers for each program. In FIG. 10, the version of each program is "Version: 1". However, it will be understood that each sound processing program may be updated (e.g., by modifying certain parameters represented within the sound processing programs in accordance with a patient's needs and preferences) to new versions. As with the program types, the version numbers of each sound processing program 1002 is indicated in the name of the sound processing program 1002. For example, sound processing program 1002-A1 includes a "1" (after the "A") to indicate that sound processing program 1002-A1 represents Version 1 of Program A.

In some examples, sound processing programs 1002 may be replacement or backup copies of sound processing programs that have previously been used by sound processor 500 (or a predecessor of sound processor 500) and/or stored on local storage facility 506. For example, if sound processor 500 is a new (e.g., replacement) sound processor that takes the place of a lost, broken, or outdated sound processor that was used previously, one or more of sound processing programs 1002 may be sound processing programs that were used by the previous sound processor and that are loaded onto the new sound processor 500 to continue to be used. On the other hand, one or more of sound processing programs 1002 may also be sound processing programs that have never been stored on local storage facility 506 previously, and have never been used by sound processor 500 or a predecessor to sound processor 500. In other words, certain new sound processing programs 1002 may be pushed onto sound processor 500 by remote computing system 600 (e.g., under direction of a clinician, manufacturer, etc.) to help or encourage a patient to try new or different sound processing programs (e.g., or new versions of sound processing programs), or for other suitable reasons.

To illustrate, FIG. 11 shows local storage facility 506 after new versions of certain sound processing programs and a new sound processing program have been remotely loaded onto sound processing program 500. Specifically, as shown in FIG. 11, sound processing program 1002-A1 has been replaced by a sound processing program 1002-A2, which is a new version (i.e., Version 2) of Program A for the left ear of Patient 1. Similarly, sound processing program 1002-B1 has similarly been replaced by a sound processing program 1002-132, which is a new version (i.e., Version 2) of Program B for the left ear of Patient 1. Moreover, sound processing program 1102-F1, a new sound processing program that may never have been used by sound processor 500 or stored on local storage facility 506 previously, has also been stored in local storage facility 506 along with sound processing programs 1002.

Prior to the storage of sound processing programs 1002-A2 and 1002-B2 (i.e., in the example of FIG. 10, above, where sound processing programs 1002-A1 and 1002-B1 were stored), local storage facility 506 may have stored data representative of non-preferred versions of the sound processing program. For example, Version 1 of Program A and Version 1 of Program B may have been non-preferred because they were out of date, included one or more bugs, discrepancies, or other issues, or for other reasons. Accordingly, sound processing programs 1002-A2 and 1002-B2, which are shown to replace sound processing programs 1002-A1 and 1002-B1 in local storage facility 506 in FIG. 11, may be preferred versions of the respective sound processing programs. For example, sound processing programs 1002-A2 and/or 1002-B2 may be more up to date than their respective predecessors, or may include bug fixes or the like to resolve prior issues of the non-preferred versions.

Figure 12:
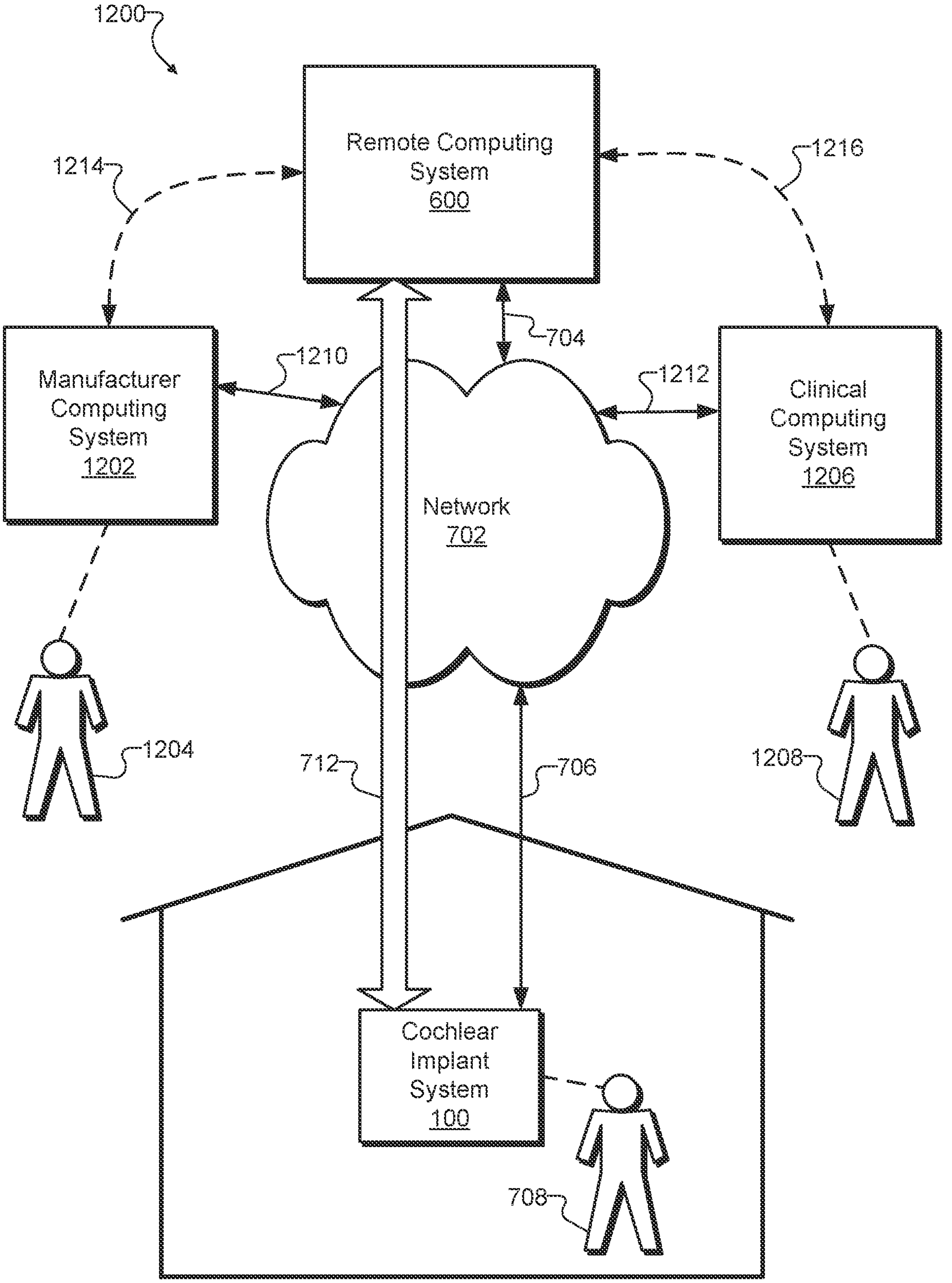
FIG. 12 illustrates another exemplary configuration in which the sound processor of FIG. 5 and the remote computing system of FIG. 6 interoperate to remotely load a sound processing program onto the sound processor according to principles described herein.

As described above, FIG. 7 illustrated one configuration (i.e., configuration 700) in which sound processor 500 and remote computing system 600 interoperate to remotely load a sound processing program onto sound processor 500 while sound processor 500 is located remotely from remote computing system 600. Along the same lines, FIG. 12 shows another exemplary configuration 1200 in which sound processor 500 and remote computing system 600 interoperate to remotely load a sound processing program onto sound processor 500. However, configuration 1200 of FIG. 12 shows additional details not illustrated in FIG. 7 related to communications with other parties and systems (e.g., clinical personnel, manufacturing personnel, technicians, respective computing systems associated with these parties, and the like) that may occur as part of the remote loading.

Specifically, like FIG. 7, FIG. 12 shows that cochlear implant system 100 (i.e., which includes sound processor 500, cochlear implant 108, etc., as illustrated and described above) is located along with patient 708 in a location (e.g., such as the home of patient 708) that is remote from a location where remote computing system 600 is located. Between cochlear implant system 100 and remote computing system 600 is network 702, which both systems 100 and 600 are communicatively coupled with (i.e., by way of connections 706 and 704, respectively). Active network link 712 also connects remote computing system 600 and cochlear implant system 100 by way of network 702, as described above.

Along with these elements common to configuration 700, configuration 1200 also includes various new elements. For example, as shown, configuration 1200 includes a manufacturing computing system 1202 associated with manufacturing personnel 1204, and a clinical computing system 1206 associated with clinical personnel 1208. As further shown, manufacturer computing system 1202 may be communicatively coupled with network 702 by way of a connection 1210, while clinical computing system 1206 may be communicatively coupled with network 702 by way of a connection 1212.

As described above with respect to FIG. 7, sound processor 500 may detect a unique ID of a cochlear implant within cochlear implant system 100, and sound processor 500 (i.e., within cochlear implant system 100) and remote computing system 600 may establish an active network link 712 by way of network 702. In some examples, the establishment of active network link 712 is initiated by sound processor 500, while, in other examples, the establishment of active network link 712 is initiated by remote computing system 600.

Once the unique ID of the cochlear implant within cochlear implant system 100 is detected, sound processor 500 may transmit the unique ID to remote computing system 600 over active network link 712, and remote computing system 600 may receive the unique ID, as described above. Based on the unique ID, remote computing system 600 may identify a sound processing program associated with the cochlear implant represented by the unique ID (e.g., from the repository of sound processing programs in remote storage facility 606), and may transmit data representative of the identified sound processing program to sound processor 500 over active network link 712 to be received by sound processor 500. In response to the transmission of the data representative of the identified sound processing program, remote computing system 600 may update a patient history for the patient associated with cochlear implant system 100 (e.g., a clinical history 804 associated with patient 708 from patient clinical history repository 802, described above in relation to FIG. 8) to indicate that the identified sound processing program has been loaded onto sound processor 500.

Additionally, remote computing system 600 may provide data representative of a patient file update to a computing system associated with a clinician of the patient (e.g., clinical computing system 1206), to a computing system associated with a manufacturer of the sound processor (e.g., manufacturing computing system 1202), or to another similar system. For example, the data representative of the patient file update may include a record of the transmission of the data representative of the identified sound processing program to the sound processing program. The record may include, for instance, information related to what sound processing program was requested, what cochlear implant unique ID was provided, what sound processing program (e.g., name, version number, etc.) was transmitted, when the sound processing program was requested and/or transmitted, and/or any other information as may serve a particular implementation.

Manufacturer computing system 1202 and/or manufacturing personnel 1204 may be associated with a manufacturer, distributor, reseller, retail outlet, or other entity that may provide (e.g., sell or otherwise distribute) a sound processor used by patient 708 (e.g., sound processor 500 within cochlear implant system 100). In some examples, manufacturer computing system 1202 and/or manufacturing personnel 1204 may be associated with a company that designs and manufactures cochlear implant system 100 (i.e., including sound processor 500), or may be closely associated with such a company. In alternative examples, manufacturer computing system 1202 and/or manufacturing personnel 1204 may provide components of cochlear implant system 100 (e.g., including sound processor 500), but may not actually be responsible for the design or manufacture of the cochlear implant system components.

Similarly, clinical computing system 1206 and clinical personnel 1208 may be associated with any clinic, business, practice, or other entity that works with patients such as patient 708 to program (i.e., fit) cochlear implant systems such as cochlear implant system 100. For example, clinical personnel 1208 may work with patients to determine characteristics of the patients' unique hearing abilities, preferences, etc., and may program the patients' respective cochlear implant systems to operate in accordance with these characteristics. As such, patient 708 may attend periodic appointments at the programming clinic to allow clinical personnel 1208 to determine, track, and promote the progress of patient 708 with respect to cochlear implant system 100. To this end, clinical computing system 1206 may store and/or update records related to patient 708 (e.g., including the patient file updates with the record of the transmission of the data representative of the identified sound processing program described above), and related to the progress of patient 708 with respect to cochlear implant system 100. For example, records of the progress of patient 708, along with past and current sound processing programs, past and current characteristics unique to the patient's hearing abilities and preferences, and other suitable data specific to patient 708 may be maintained within clinical computing system 1206 (e.g., by clinical personnel 1208).

Connections 1210 and 1212 may be implemented by any suitable connections as may serve a particular implementation. For example, as with connections 704 and 706, connections 1210 and 1212 may be implemented by, for instance, a wireless connection, a wired connection, by way of another device, or by way of any other type of connection as may serve a particular implementation. In some examples, as illustrated by dashed arrows 1214 and 1216, respectively, remote computing system 600 may optionally be integrated within (i.e., implemented by, included as part of, etc.) at least one of manufacturer computing system 1202 and clinical computing system 1206. As such, remote computing system 600 may be owned, operated, and/or otherwise associated with manufacturing personnel 1204 and/or clinical personnel 1208, and data may be transmitted directly between remote computing system 600 and the respective computing system (i.e., without necessarily travelling by way of network 702). In other examples, remote computing system 600 may be managed and maintained by a third party not directly or closely tied to the manufacturer or the programming clinic.

After a sound processing program has been identified, transmitted, recorded and/or reported by remote computing system 600, sound processor 500 may receive the sound processing program over active network link 712, as described above in relation to FIG. 7. In some examples, the sound processing program may have never been stored on the local storage facility associated with sound processor 500 (i.e., local storage facility 506) prior to this moment, whereas, in other examples, the sound processing program may be reloaded onto sound processor 500 after sound processor 500 has experienced issues and/or been replaced. Regardless, at the time that a particular sound processing program is transmitted to the local storage facility associated with sound processor 500, the local storage facility may be blank (see FIG. 9) or may store data representative of at least one additional sound processing program (see FIG. 10).

One benefit of having remote computing system 600 interconnected by way of network 702 with both manufacturer computing system 1202 and clinical computing system 1206 is that, if patient 708 experiences issues with the remote loading of the sound processing program or has questions or the like, systems 1202 or 1206, or personnel 1204 or 1208, may be called upon to provide assistance to patient 708 to ensure that the remote loading process goes smoothly. For example, if patient 708 experiences a problem with remotely loading a particular sound processing program, patient 708 may access help documentation available on one of systems 1202 or 1206, or may page an on-call technician included among personnel 1204 or 1208 for assistance. Ultimately, the interconnectedness of the various parties and systems in FIG. 12 may help provide a smooth, user-friendly experience to enable patient 708 to remotely load all the sound processing programs he or she desires onto sound processor 500, and to efficiently troubleshoot issues as they arise.

Figure 13:
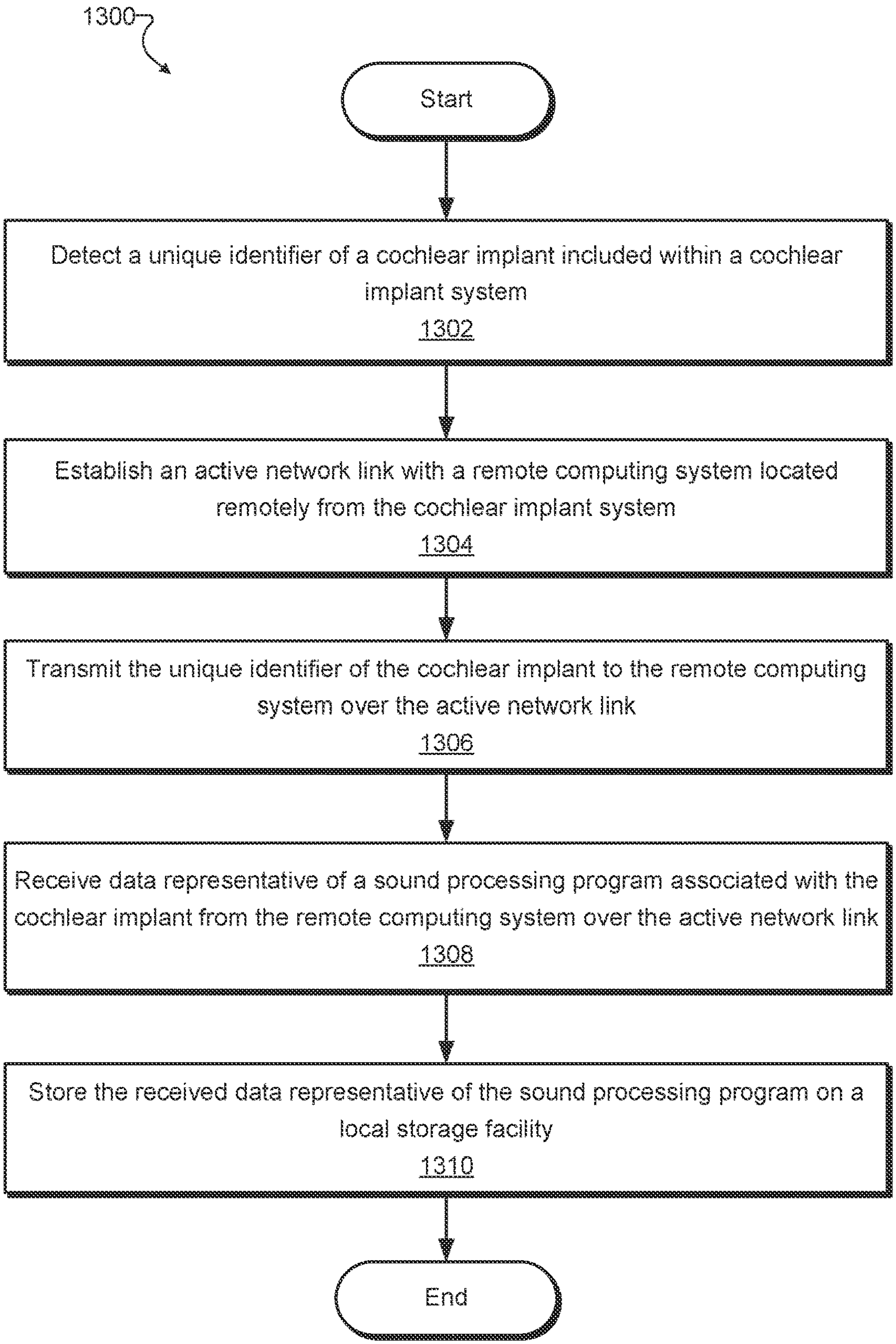
FIGS. 13-14 illustrate exemplary methods for remote loading of a sound processing program onto a sound processor included within a cochlear implant system according to principles described herein.

FIG. 13 illustrates an exemplary method 1300 for remote loading of a sound processing program onto a sound processor included within a cochlear implant system. One or more of the operations shown in FIG. 13 may be performed by sound processor 500 and/or any implementation thereof. While FIG. 13 illustrates exemplary operations according to one embodiment, other embodiments may omit, add to, reorder, and/or modify any of the operations shown in FIG. 13.

In operation 1302, a sound processor included within a cochlear implant system may detect a unique identifier of a cochlear implant included within the cochlear implant system. For example, the cochlear implant may be implanted within a patient and communicatively coupled with the sound processor. Operation 1302 may be performed in any of the ways described herein.

In operation 1304, the sound processor may establish an active network link with a remote computing system located remotely from the cochlear implant system. For example, the sound processor may establish the active network link by way of a network between the sound processor and the remote computing system. Operation 1304 may be performed in any of the ways described herein.

In operation 1306, the sound processor may transmit the unique identifier of the cochlear implant to the remote computing system. For example, the sound processor may transmit the unique identifier by way of the network and over the active network link. Operation 1306 may be performed in any of the ways described herein.

In operation 1308, the sound processor may receive data representative of a sound processing program associated with the cochlear implant. In some examples, the data representative of the sound processing program may be received from the remote computing system by way of the network and over the active network link. Operation 1308 may be performed in any of the ways described herein. Additionally, operation 1308 may be performed in response to the transmission of the unique identifier in operation 1306.

In operation 1310, the sound processor may store the received data representative of the sound processing program on a local storage facility associated with the sound processor. Operation 1310 may be performed in any of the ways described herein.

Figure 14:
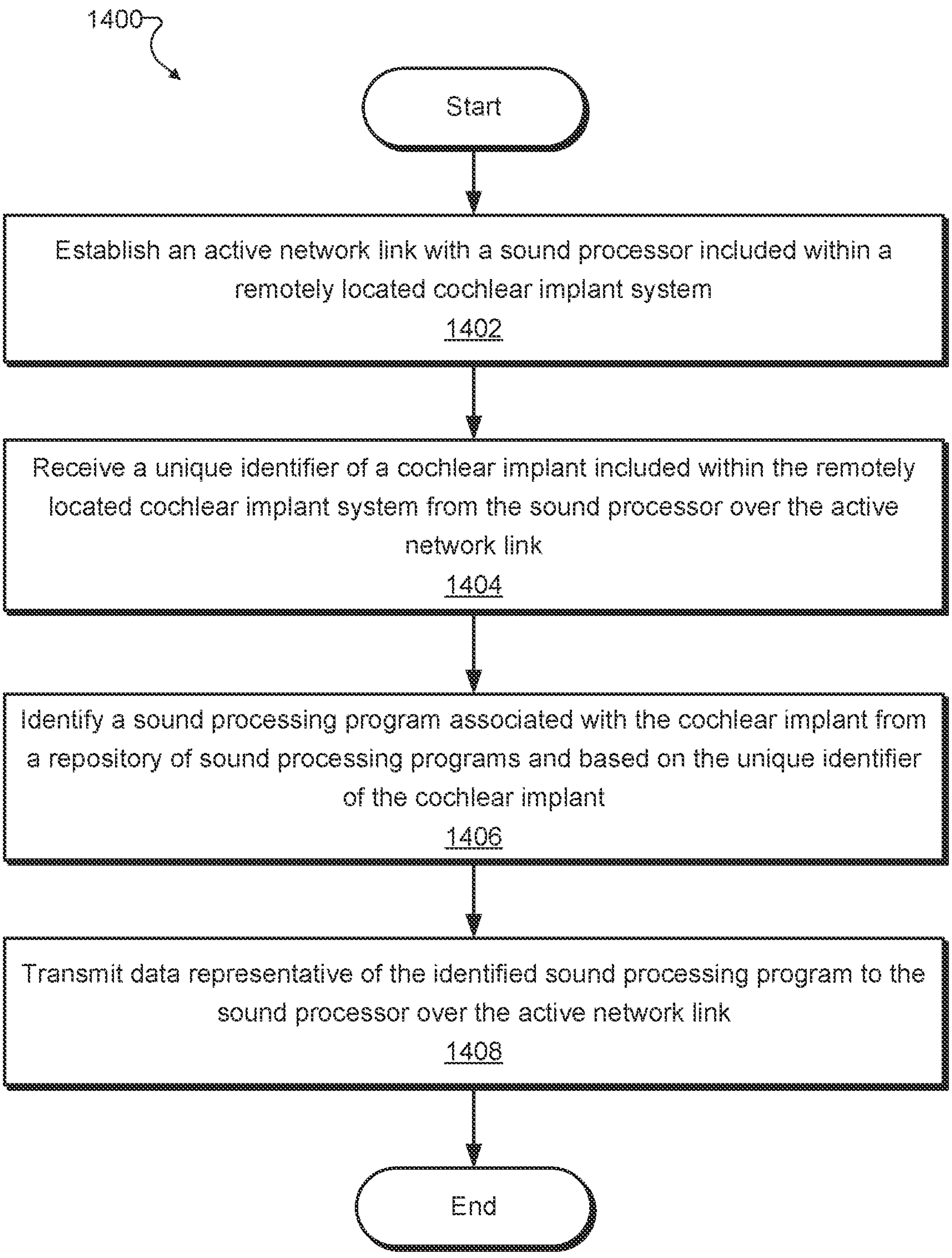

FIG. 14 illustrates an exemplary method 1400 for remote loading of a sound processing program onto a sound processor included within a cochlear implant system. One or more of the operations shown in FIG. 14 may be performed by remote computing system 600 and/or any implementation thereof. While FIG. 14 illustrates exemplary operations according to one embodiment, other embodiments may omit, add to, reorder, and/or modify any of the operations shown in FIG. 14.

In operation 1402, a remote computing system may establish an active network link with a sound processor by way of a network. For example, the sound processor may be included within a cochlear implant system that is located remotely from the remote computing system. In some implementations, the remote computing system may include a remote storage facility that stores a repository of sound processing programs associated with different cochlear implants included within different cochlear implant systems. Operation 1402 may be performed in any of the ways described herein.

In operation 1404, the remote computing system may receive a unique identifier of a cochlear implant included within the cochlear implant system. For instance, the cochlear implant may be implanted within a patient and communicatively coupled with the sound processor. In some examples, the remote computing system may receive the unique identifier from the sound processor by way of the network and over the active network link. Operation 1404 may be performed in any of the ways described herein.

In operation 1406, the remote computing system may identify a sound processing program associated with the cochlear implant. For example, the sound processing program may be included in the repository of sound processing programs stored on the remote storage facility. In some example, the remote computing system may identify the sound processing program based on the unique identifier of the cochlear implant received in operation 1404. Operation 1406 may be performed in any of the ways described herein.

In operation 1408, the remote computing system may transmit data representative of the identified sound processing program to the sound processor by way of the network and over the active network link. In some examples, operation 1408 may be performed in response to the identification of the sound processing program associated with the cochlear implant in operation 1406. Operation 1408 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), flash memory (e.g., FLASH-EEPROM), any other memory chip or cartridge, and/or any other tangible medium from which a computer can read.

Figure 15:
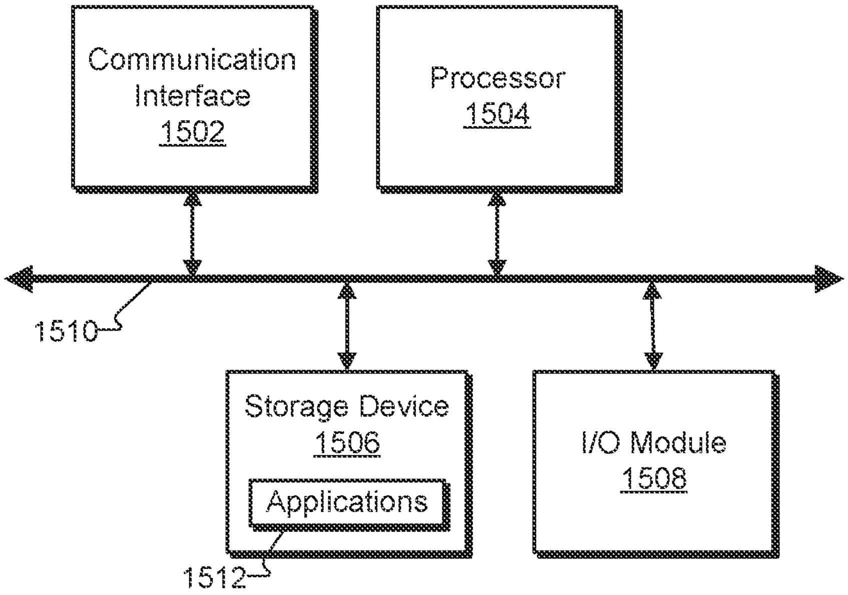
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual reality experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with facilities 502 or 504 of sound processor 500 (see FIG. 5) or facilities 602 or 604 of remote computing system 600 (see FIG. 6). Likewise, local storage facility 506 of sound processor 500 and/or remote storage facility 606 of remote computing system 600 may be implemented by or within storage device 1506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A cochlear implant system comprising:
a cochlear implant configured to be implanted within a patient; and
a sound processor communicatively coupled to the cochlear implant and configured to:
store, on a local storage facility associated with the sound processor, a non-preferred version of a sound processing program associated with the cochlear implant and including customized data representing a particular program by which an incoming audio signal is to be processed so as to stimulate the patient in accordance with needs or preferences of the patient as the patient uses the cochlear implant in a particular type of listening environment;
detect a unique identifier of the cochlear implant;
establish, by way of a wide area network, communication with a remote computing system located remotely from the cochlear implant system in a different building than the cochlear implant system;
transmit, to the remote computing system by way of the wide area network, the unique identifier of the cochlear implant;
receive, in response to the transmission of the unique identifier and by way of the wide area network, a preferred version of the sound processing program;
replace the non-preferred version of the sound processing program on the local storage facility with the preferred version of the sound processing program; and
direct the cochlear implant to apply electrical stimulation to the patient so as to at least partially restore hearing function for the patient.

2. The cochlear implant system of claim 1, wherein the local storage facility associated with the sound processor is implemented by a built-in storage device included internally within the sound processor.

3. The cochlear implant system of claim 1, wherein the local storage facility associated with the sound processor is implemented by a built-in storage device included internally within the cochlear implant to which the sound processor is communicatively coupled.

4. The cochlear implant system of claim 1, wherein the local storage facility associated with the sound processor is implemented by a storage device included within a battery assembly of the sound processor, the battery assembly removably couplable from the sound processor and configured to power the sound processor when coupled with the sound processor.

5. The cochlear implant system of claim 1, wherein the sound processor is further configured, when the sound processor is a new sound processor that has never been used, to initiate communication with the remote computing system and to receive and store a version of the sound processing program onto the local storage facility while the local storage facility does not yet store any sound processing programs.

6. The cochlear implant system of claim 1, wherein:
the establishing of the communication with the remote computing system is initiated by the remote computing system; and
along with storing the sound processing program, the local storage facility further stores at least one additional sound processing program.

7. The cochlear implant system of claim 1, wherein:
the sound processor is further configured to transmit, to the remote computing system together with the unique identifier of the cochlear implant, a sound processing program download request identifying the sound processing program associated with the cochlear implant; and
the receiving of the preferred version of the sound processing program is further in response to the transmitting of the sound processing program download request.

8. The cochlear implant system of claim 1, wherein:
the directing of the cochlear implant to apply the electrical stimulation to the patient includes activating, on the sound processor, the sound processing program stored on the local storage facility.

9. A remote computing system comprising:
a remote storage facility that stores a repository of sound processing programs, the sound processing programs in the repository associated with different cochlear implants included within different cochlear implant systems; and
at least one physical computing component configured to:
establish, by way of a wide area network, communication with a sound processor included within a cochlear implant system that is located remotely from the remote computing system in a different building than the remote computing system;
receive, from the sound processor and by way of the wide area network, a unique identifier of a cochlear implant included within the cochlear implant system, the cochlear implant implanted within a patient and communicatively coupled with the sound processor;
identify, based on the unique identifier of the cochlear implant, a sound processing program associated with the cochlear implant and that is included in the repository of sound processing programs, wherein:
a non-preferred version of the identified sound processing program is stored on a local storage facility associated with the sound processor,
a preferred version of the identified sound processing program is stored in the repository of the remote storage facility, and
the identified sound processing program includes customized data that represents a particular program by which an incoming audio signal is to be processed so as to stimulate the patient in accordance with needs or preferences of the patient as the patient uses the cochlear implant in a particular type of listening environment; and
transmit, in response to the identifying of the sound processing program associated with the cochlear implant and by way of the wide area network, the preferred version of the identified sound processing program to the sound processor for:

replacement of the non-preferred version of the sound processing program on the local storage facility with the preferred version , and use by the sound processor in directing the cochlear implant to apply electrical stimulation to the patient so as to at least partially restore hearing function for the patient.

10. The remote computing system of claim 9, wherein the local storage facility associated with the sound processor is implemented by a built-in storage device included internally within the sound processor.

11. The remote computing system of claim 9, wherein the local storage facility associated with the sound processor is implemented by a built-in storage device included internally within the cochlear implant to which the sound processor is communicatively coupled.

12. The remote computing system of claim 9, wherein the local storage facility associated with the sound processor is implemented by a storage device included within a battery assembly of the sound processor, the battery assembly removably couplable from the sound processor and configured to power the sound processor when coupled with the sound processor.

13. The remote computing system of claim 9, wherein:

when the sound processor is a new sound processor that has never been used, communication between the remote computing system and the sound processor is initiated by the sound processor; and the sound processor receives and stores a version of the identified sound processing program onto the local storage facility while the local storage facility does not yet store any sound processing programs.

14. The remote computing system of claim 9, wherein:

the establishing of the communication with the sound processor is initiated by the remote computing system; and along with storing the identified sound processing program, the local storage facility further stores at least one additional sound processing program.

15. The remote computing system of claim 9, wherein:

the at least one physical computing component is further configured to receive, from the sound processor together with the unique identifier of the cochlear implant, a sound processing program download request identifying the sound processing program associated with the cochlear implant; and the identifying of the sound processing program is based on the sound processing program download request.

16. The remote computing system of claim 9, wherein:

the remote storage facility further stores, together with the repository of sound processing programs, data representative of clinical histories for patients associated with the different cochlear implants included within the different cochlear implant systems; and the identifying of the sound processing program associated with the cochlear implant is further based on data that is stored within the remote storage facility and is representative of a clinical history for the patient in which the cochlear implant is implanted.

17. A method comprising:

storing, on a local storage facility associated with a sound processor included within a cochlear implant system, a non-preferred version of a sound processing program associated with a cochlear implant communicatively coupled with the sound processor and implanted within a patient, the sound processing program including customized data representing a particular program by which an incoming audio signal is to be processed so as to stimulate the patient in accordance with needs or preferences of the patient as the patient uses the cochlear implant in a particular type of listening environment;

detecting, by the sound processor, a unique identifier of the cochlear implant ;

establishing, by the sound processor and by way of a wide area network, communication with a remote computing system located remotely from the cochlear implant system in a different building than the cochlear implant system;

transmitting, by the sound processor and by way of the wide area network, the unique identifier of the cochlear implant to the remote computing system;

receiving, by the sound processor in response to the transmission of the unique identifier and by way of the wide area network, a preferred version of the sound processing program;

replacing, by the sound processor, the non-preferred version of the sound processing program on the local storage facility with the preferred version of the sound processing program; and directing, by the sound processor, the cochlear implant to apply electrical stimulation to the patient so as to at least partially restore hearing function for the patient.

18. A method comprising:

establishing, by a remote computing system and by way of a wide area network, communication with a sound processor included within a cochlear implant system that is located remotely from the remote computing system in a different building than the remote computing system, the remote computing system including a remote storage facility that stores a repository of sound processing programs associated with different cochlear implants included within different cochlear implant systems;

receiving, by the remote computing system from the sound processor by way of the wide area network, a unique identifier of a cochlear implant included within the cochlear implant system, the cochlear implant implanted within a patient and communicatively coupled with the sound processor;

identifying, by the remote computing system based on the unique identifier of the cochlear implant, a sound processing program associated with the cochlear implant and that is included in the repository of sound processing programs, wherein:

a non-preferred version of the identified sound processing program is stored on a local storage facility associated with the sound processor, a preferred version of the identified sound processing program is stored in the repository of the remote storage facility, and the identified sound processing program includes customized data that represents a particular program by which an incoming audio signal is to be processed so as to stimulate the patient in accordance with needs or preferences of the patient as the patient uses the cochlear implant in a particular type of listening environment; and transmitting, by the remote computing system in response to the identifying of the sound processing program associated with the cochlear implant and by way of the wide area network, the preferred version of the identified sound processing program to the sound processor for:

replacement of the non-preferred version of the sound processing program on the local storage facility with the preferred version , and use by the sound processor in directing the cochlear implant to apply electrical stimulation to the patient so as to at least partially restore hearing function for the patient.

19. The method of claim 17, wherein:

the establishing of the communication with the remote computing system is initiated by the remote computing system; and along with storing the sound processing program, the local storage facility further stores at least one additional sound processing program.

20. The method of claim 18, wherein:

the establishing of the communication with the remote computing system is initiated by the remote computing system; and along with storing the sound processing program, the local storage facility further stores at least one additional sound processing program.

* * * * *